US012289428B2

(12) United States Patent
Pandey et al.

(10) Patent No.: US 12,289,428 B2
(45) Date of Patent: Apr. 29, 2025

(54) SYSTEM AND METHOD TO PRIORITIZE AND RESUME DISCONNECTED CUSTOMER INTERACTIONS

(71) Applicant: NICE LTD., Ra'anana (IL)

(72) Inventors: Bhupendra Pandey, Pune (IN); Dhanendra Singh, Pune (IN); Rajesh Katkar, Pune (IN); Salil Dhawan, Pune (IN)

(73) Assignee: NICE LTD., Ra'anana (IL)

(*) Notice: Subject to any disclaimer, the term of this patent is extended or adjusted under 35 U.S.C. 154(b) by 182 days.

(21) Appl. No.: 18/335,617

(22) Filed: Jun. 15, 2023

(65) Prior Publication Data

US 2024/0422264 A1 Dec. 19, 2024

(51) Int. Cl.
*H04M 3/00* (2024.01)
*H04M 3/51* (2006.01)
*H04M 3/523* (2006.01)

(52) U.S. Cl.
CPC ....... *H04M 3/5233* (2013.01); *H04M 3/5175* (2013.01); *H04M 2203/408* (2013.01)

(58) Field of Classification Search
CPC .......................... H04M 3/5233; H04M 3/5175
See application file for complete search history.

(56) References Cited

U.S. PATENT DOCUMENTS

| 10,827,072 B1* | 11/2020 | Deole ............... H04M 3/5191 |
| 2008/0175374 A1* | 7/2008 | Lauridsen .......... H04M 3/5191 |
| | | 379/266.1 |
| 2016/0323418 A1* | 11/2016 | Elyashiv ............ H04L 65/1096 |
| 2017/0034223 A1* | 2/2017 | Arscott .............. H04L 65/1104 |
| 2022/0030300 A1* | 1/2022 | Periyaeluvan ... H04N 21/44231 |

* cited by examiner

*Primary Examiner* — Rasha S Al Aubaidi
(74) *Attorney, Agent, or Firm* — Haynes and Boone, LLP

(57) ABSTRACT

A system automatically prioritizes and resumes disconnected customer interactions. The system includes a processor to perform operations that include: receiving a list of disconnected customer interactions, including their metadata; using a prioritization module and the metadata, assigning a priority score to each disconnected interaction; with a queuing module and the respective priority scores, with an agent assignment module, arranging the disconnected interactions in a priority order; assigning an available agent to each disconnected interaction in the priority order; selecting a channel for each disconnected interaction in the priority order, based on a channel recommendation module and the metadata; and re-connecting a disconnected customer with the respective agent via the respective channel for each respective disconnected customer interaction in the priority order.

18 Claims, 19 Drawing Sheets

Results  Data Preview

Table: DATAHUB.ANALYTICS_REFINED.SENTIMENT_DIM

[ Data | Details ]

Filter result...

| SENTIMENT_ID | SENTIMENT_NAME | _CREATED_TIMESTAMP |
|---|---|---|
| 1 | POSITIVE | 2021-02-21 15:15:53.987 +0000 |
| 2 | NEGATIVE | 2021-02-21 15:15:53.987 +0000 |
| 3 | MIXED | 2021-02-21 15:15:53.987 +0000 |
| 4 | NEUTRAL | 2021-02-21 15:15:53.987 +0000 |

| AGENT_KEY | INTERACTION_KEY | CHANNEL_KEY | ELEVATED_FLAG | DISPOSITION_NOTES | TENANT_ID | CREATED_TIME |
|---|---|---|---|---|---|---|
| 48826238 | 8140778543142... | 3 | 0 | {"customereating": 4, "issue_urgency": "high", "network_connetivity": "good", "req_type": "query"} | 11ed145c-5e4e-c... | 2022-10-16... |
| 48826238 | 8140778543142... | 3 | 1 | {"customereating": 3, "issue_urgency": "medium", "network_connetivity": "bad", "req_type": "update"} | 11ed145c-5e4e-c... | 2022-10-16... |
| 51288407 | 2815599792047... | 3 | 0 | {"customereating": 4, "issue_urgency": "high", "network_connetivity": "good", "req_type": "query"} | 11ed145a-5c51-0... | 2022-10-16... |
| 51288407 | 2815599792047... | 3 | 1 | {"customereating": 3, "issue_urgency": "medium", "network_connetivity": "bad", "req_type": "update"} | 11ed145a-5c51-0... | 2022-10-16... |
| 51306238 | 2877972516197... | 3 | 0 | {"customereating": 4, "issue_urgency": "high", "network_connetivity": "good", "req_type": "query"} | 11ed145a-5c51-0... | 2022-10-16... |
| 51306238 | 2877972516197... | 3 | 1 | {"customereating": 3, "issue_urgency": "medium", "network_connetivity": "bad", "req_type": "update"} | 11ed145a-5c51-0... | 2022-10-16... |
| 48911082 | 8127005989486... | 3 | 1 | {"customereating": 3, "issue_urgency": "medium", "network_connetivity": "bad", "req_type": "update"} | 11ed11d6-7ac7-0... | 2022-10-16... |

Fig. 13

SYSTEM AND METHOD TO PRIORITIZE AND RESUME DISCONNECTED CUSTOMER INTERACTIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

TECHNICAL FIELD

The subject matter described herein relates to a systems and methods for detecting, prioritizing, and reconnecting disconnected customer interactions at a contact center. This prioritized reconnection system has particular but not exclusive utility for contact centers that use a variety of different digital channels to interact with customers.

BACKGROUND

With the advent of digital contact centers, there is an increased need to leverage digital channels (e.g., chat, email, short message service (SMS), video, etc.) in a contact center for various contact scenarios. It is understood that dropped connections are a major driver of customer satisfaction, and this applies to digital channels as well as voice. Unfortunately, there may invariably be instances wherein customer interactions (voice or digital interaction) are affected by connection issues, customer initiated abrupt disconnection, and/or prolonged nonresponse from the customer.

Digital disconnection refers to any specific configurable time post, applicable to digital channels, in which there is no response from the customer, although the interaction is still in the 'Open' state. Relevant use cases include interactions wherein specific information is sought from the customer which is not received.

Total contact center interactions from customers number approximately 250 million interactions per month. Disconnected interactions due to various scenarios are considered to be ~5% of total interactions, or 12.5 million dropped interactions per month. Within this 5%, it can be assumed that 75% of the customers would actually want to reach out to the contact center agent again in order to close the conversation or resolve their queries/issues, or that 25% of disconnected customers may not feel the need to speak to the contact center again in spite of their conversation getting dropped (e.g., because they may want to move on with their other tasks and reach out the contact center at a later time). 75% of 12.5 million, it is equal to ~9.3 million interactions per month (9,375,000) where the customer wishes to reconnect. It is also noted that an average digital interaction is concluded within 10 messages.

In all such scenarios, there may be an increased need for promptly reverting and servicing such customers, as they can quickly convert into unsatisfied customers.

The information included in this Background section of the specification, including any references cited herein and any description or discussion thereof, is included for technical reference purposes only and is not to be regarded as subject matter by which the scope of the disclosure is to be bound.

SUMMARY

Disclosed is a prioritized reconnection system with particular, but not exclusive, utility for contact centers using multiple digital channels for customer interaction. The prioritized reconnection system detects dropped, abandoned, or disconnected customer interactions, creates a prioritized reconnection waiting queue based on characteristics of the customer and the disconnected interaction, assigns an agent and a channel based on customer preferences, and reconnects the interaction in priority order, using the selected channel and agent.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system adapted to automatically prioritize and resume disconnected customer interactions. The system includes a processor and a non-transitory computer readable medium operably coupled thereto. The computer readable medium may include a plurality of instructions stored in association therewith that are accessible to, and executable by, the processor, to perform operations which may include: receiving a list of disconnected customer interactions, where the list includes metadata for each disconnected customer interaction; assigning a respective priority score to each respective disconnected customer interaction of the list of disconnected customer interactions with a prioritization module and the metadata; arranging the respective disconnected customer interactions in an order with a queuing module and the respective priority scores; assigning a respective available agent to each respective disconnected customer interaction in the order with an agent assignment module; selecting a respective channel for each respective disconnected customer interaction in the order based on a channel recommendation module and the metadata; and re-connecting a respective disconnected customer with the respective agent via the respective channel for each respective disconnected customer interaction in the order. Other embodiments of this aspect include corresponding computer systems, apparatus, and computer programs recorded on one or more computer storage devices, each configured to perform the actions of the methods.

Implementations may include one or more of the following features. In some embodiments, the metadata includes at least: a request type, a time of day, a duration, an agent, an escalation level, and a channel of each respective disconnected customer interaction; a request type, a time of day, a duration, a channel, an agent, a disconnection status, an escalation level; and a satisfaction level of at least two past interactions of the respective disconnected customer of the respective disconnected customer interaction; and for the respective disconnected customer of the respective disconnected customer interaction: a customer segment, a customer age group, or a customer location. In some embodiments, the customer segment is selected from a list may include small or medium business (SMB), premier, and key. In some embodiments, assigning the respective priority score includes, with the metadata, calculating, for the respective disconnected customer: a customer abandonment rate; a customer sentiment; a customer ticket history; and a customer response for callbacks on historical interactions. In some embodiments, assigning the respective available agent includes, for each available agent: determining an overall satisfaction level for the agent; determining a satisfaction level of the respective disconnected customer for the agent; and determining agent feedback of the respective disconnected customer. In some embodiments, selecting the respective channel includes: determining two preferred channels for the respective disconnected customer; determining a time preference of the respected disconnected customer for each channel of the two preferred channels; and based on the time preference, selecting a channel of the two preferred channels. In some embodiments, selecting the respective channel includes computing a channel positivity score for the channel. In some embodiments, selecting the respective channel involves at least one of a customer age group, a customer profession, a customer location, or a last channel used. In some embodiments, the selected channel is a voice channel or a video channel. In some embodiments, the selected channel is a short message service (SMS) text channel, a real-time chat (RTC) channel, or a social media channel. Implementations of the described techniques may include hardware, a method or process, or computer software on a computer-accessible medium.

One general aspect includes a computer-implemented method adapted to automatically prioritize and resume disconnected customer interactions. The computer-implemented method includes receiving a list of disconnected customer interactions, where the list includes metadata for each disconnected customer interaction; assigning a respective priority score to each respective disconnected customer interaction of the list of disconnected customer interactions with a prioritization module and the metadata; arranging the respective disconnected customer interactions in an order with a queuing module and the respective priority scores, assigning a respective available agent to each respective disconnected customer interaction in the order with an agent assignment module, selecting a respective channel for each respective disconnected customer interaction in the order based on a channel recommendation module and the metadata, and re-connecting a respective disconnected customer with the respective agent via the respective channel for each respective disconnected customer interaction in the order. Other embodiments of this aspect include corresponding computer systems, apparatus, and computer programs recorded on one or more computer storage devices, each configured to perform the actions of the methods.

Implementations may include one or more of the following features. In some embodiments, the metadata may include: a request type, a time of day, a duration, an agent, an escalation level, and a channel of each respective disconnected customer interaction; a request type, a time of day, a duration, a channel, an agent, a disconnection status, an escalation level; and a satisfaction level of at least two past interactions of the respective disconnected customer of the respective disconnected customer interaction; and for the respective disconnected customer of the respective disconnected customer interaction: a customer segment, a customer age group, or a customer location. In some embodiments, the customer segment is selected from a list may include small or medium business (SMB), premier, and key. In some embodiments, assigning the respective priority score may include, with the metadata, calculating, for the respective disconnected customer: a customer abandonment rate; a customer sentiment; a customer ticket history; and a customer response for callbacks on historical interactions. In some embodiments, assigning the respective available agent may include, for each available agent: determining an overall satisfaction level for the agent; determining a satisfaction level of the respective disconnected customer for the agent; and determining agent feedback of the respective disconnected customer. In some embodiments, selecting the respective channel may include: determining two preferred channels for the respective disconnected customer; determining a time preference of the respected disconnected customer for each channel of the two preferred channels; and based on the time preference, selecting a channel of the two preferred channels. In some embodiments, selecting the respective channel may include computing a channel positivity score for the channel. In some embodiments, selecting the respective channel is based on at least one of a customer age group, a customer profession, a customer location, or a last channel used. In some embodiments, the selected channel is a voice channel or a video channel. In some embodiments, the selected channel may include a short message service (SMS) text channel, a real-time chat (RTC) channel, or a social media channel. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the prioritized reconnection system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 11 is an example screen display of a channel positivity table or sentiment dimension table, in accordance with at least one embodiment of the present disclosure.

FIG. 12 is an example screen display of a disconnected interactions table, in accordance with at least one embodiment of the present disclosure.

FIG. 13 is an example screen display of an agent contact table, in accordance with at least one embodiment of the present disclosure.

DETAILED DESCRIPTION

Figure 1:
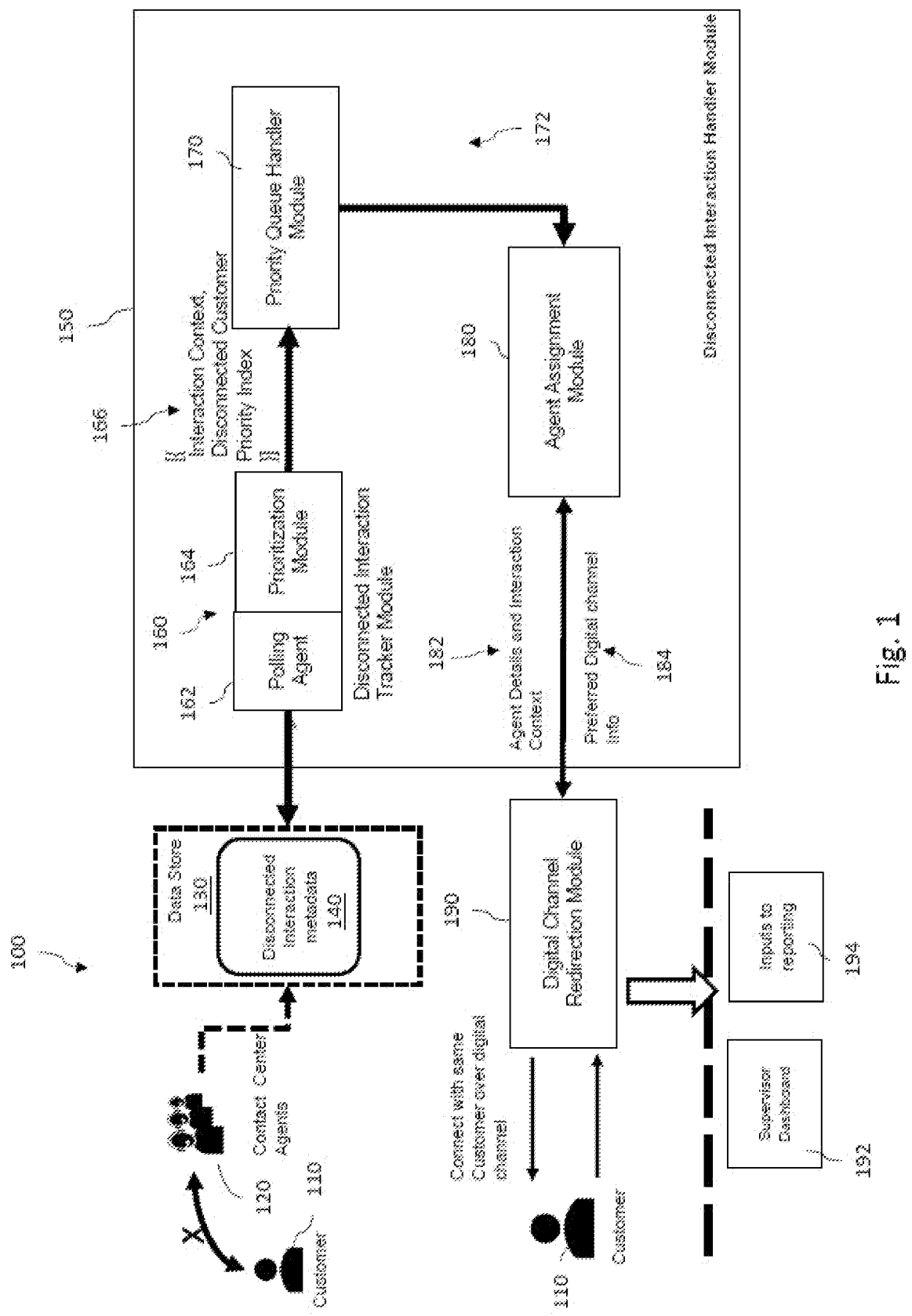
FIG. 1 is a schematic, diagrammatic representation, in block diagram form, of an example prioritized reconnection system, in accordance with at least one embodiment of the present disclosure.

In accordance with at least one embodiment of the present disclosure, a prioritized reconnection system is provided. A long-felt need exists for systems and methods to allow contact centers to leverage digital channels made available to each customer effectively and promptly for quick and better reach, e.g., to reconnect an agent and customer after undesired disconnection. Handling such interactions may ensure that the average age of customer tickets (including on digital channels) will be well-managed at all times, and that agents are not spending time excessively or repetitively on open tickets. Such a solution can lead to increased customer satisfaction and increased net promoter score (NPS) for the organization, and may thus facilitate more rapid adoption of digital channels by contact center customers that do not already use them.

Digital disconnection may, in some cases, refer to a specific configurable time (applicable to digital channels) past which there is no response from the customer while the interaction is still in 'Open' state. Relevant use cases include interactions wherein specific information is sought from the customer, which is not received. Handling such interactions according to the methods described herein can ensure that average age of customer tickets (including on digital channels) will be well-managed all the time and agents are not spending time excessively or repetitively on open tickets.

In a first exemplary scenario, an agent requests additional documents on WhatsApp to service a customer claim request, but the service ticket in a 'Need Info—From Customer' category exceeds a configurable time limit. The interaction is therefore added to the database of disconnected interactions. In a second exemplary scenario, an agent requests additional details on a service ticket raised on a digital channel in a 'Report a Fraud' interaction with a bank, but the service ticket in the 'Need Info—From Customer' category exceeds the configurable time. Again, the interaction is added to the disconnected interaction data store. In a third exemplary scenario, an agent requests additional details on a service ticket raised on a digital channel for processing a cancellation refund for an airline ticket. The service ticket in the 'Need Info—From Customer' category exceeds the configurable time limit, and so the interaction is again added to the disconnected interaction data store. These timeouts may be caused by customer distraction, technical difficulties, or otherwise. Myriad other scenarios exist and fall within the scope of the present disclosure, including but not limited to hangups, accidental disconnections, hardware errors, software crashes, network congestion, and otherwise.

In an example, the present disclosure can be used to rapidly reconnect a majority or even substantially all of the ~9.3 million dropped interactions per month, which can involve restoring approximately 93 million messages per month (or 1116 million messages per year) to the call center flow for a tool such as Nice CXone, which occupies ~25% of the overall contact center industry business. Thus, from a contact center industry perspective, the additional message traffic could be 1116 million*4, or 4464 million messages per year. It may not be possible to reconnect all dropped interactions where there is, e.g., a technical issue or outage affecting two or more of the preferred channels of interaction.

The present disclosure can increase digital adoption among customers of a contact center by efficiently managing a disconnection queue. The disconnection queue management system can identify and organize the customer interactions disconnected due to a variety of reasons, and analyze any available customer-provided inputs related to the interaction, customer history, and customer interaction statistics, and can make use of those inputs to map such interactions to adequate digital channels in case of disconnection, for further engagement with the customer. The disconnection queue management system is applicable to both voice and digital interactions.

The disconnection queue management system can ensure prompt action on disconnected interactions, while potentially increasing digital adoption in the process. Interactions that have a "Disconnected Customer Priority Index" rated as "High" can be redirected to an available digital channel and resolved accordingly. The original request of the customer can be tracked, such that once it's redirected to a digital channel, the agent knows what is going on and the customer may not need to explain everything from scratch.

This solution can complement existing routing mechanisms. The disconnection queue management system can detect whether the disconnected customer is already in a conversation with an agent (for a separate ticket). In such a case, in one embodiment an immediate request for reconnection may not be sent, or may be sent only if the agent requests it or a customer profile includes such a standing request. The disconnection queue management system includes the following components:

Disconnected Interaction Tracker Module—a Polling Agent will poll disconnected interactions and a Disconnected Customer Priority Index Module will take into consideration factors related to the disconnected interaction, past customer interaction history, etc., and will determine a Disconnected Customer Priority Index (DCPI) which can then serve as an input to a Priority Queue Handler Module.

Priority Queue Handler Module—this module will have its own separate priority queue to store metadata of disconnected queries based on the DCPI. This module is also responsible to identify the top two preferred digital channels for the customer, if such a selection has been made or can be determined, e.g., based on past customer interactions.

Agent Assignment Module—this module identifies the best-suited available agent based on the available agents' required skill sets on the preferred digital channel. Agent information may for example be fetched from the data store.

Digital Channel Redirection Module—This module will ensure redirection of disconnected customer interactions to appropriate digital channels. In an example, this module may send an SMS text message to the customer, notifying the customer about the disconnection and suggesting connection over an alternate, digital channel.

A reduced customer dissatisfaction rate may be a critical key performance indicator (KPI) for contact centers. Thus, the disconnection queue management system may be an important tool for improving customer satisfaction and building brand loyalty, as contact center success and productivity can hinge on the perceived quality of customer experiences.

Gamification Module—This module will assist in contact center gamification projects for agent training by keeping track of the customers who have shown inclination towards digital channel adoption. The module may, for example, provide rewards and recognition to these customers. The module may also, or alternatively, provide rewards for the agent, including monetary or otherwise, when customers adopt digital channel preference.

The present disclosure aids substantially in reconnecting disconnected call center customers in a prioritized manner, by improving responsiveness based on past customer behavior. Implemented on a processor in communication with a database of past customer behavior, the prioritized reconnection system disclosed herein provides practical reduction of wait times and call abandonment rates, while driving an increase in customer satisfaction and the adoption of digital communication channels. This improved handling of dropped or abandoned calls transforms a largely manual, haphazardly prioritized reconnection process into one adapted to occur automatically and with a more consistent, logically determined priority, without the normally routine need for a human agent or supervisor to apply human judgment to the call reconnection process. This unconventional approach improves the functioning of the contact center, by ensuring that dropped or abandoned calls are reconnected swiftly, via the customer's own preferred digital channels.

The prioritized reconnection system may be implemented as a process at least partially viewable on a display, and operated by a control process executing on a processor that accepts user inputs from a keyboard, mouse, or touchscreen interface, and that is in communication with one or more databases. In that regard, the control process performs certain specific operations in response to different inputs or selections made at different times. Outputs of the prioritized reconnection system may be printed, shown on a display, or otherwise communicated to human operators. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the prioritized reconnection system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a schematic, diagrammatic representation, in block diagram form, of an example prioritized reconnection system 100, in accordance with at least one embodiment of the present disclosure. In a contact center, a contact center agent 120 is communicating with a customer 110, when the contact is disconnected. Such disconnection may be accidental on the part of either the customer 110 or the agent 120, or may result from technical difficulties including but not limited to network congestion or failure, dead phone or laptop batteries, or bugs/crashes in the customer's software for a particular communication channel. Following the disconnection, metadata 140 related to the disconnected interaction is stored in a data store 130 (e.g., a database), and retrieved by a disconnected interaction tracker module 160 of a disconnected interaction handler module 150.

The disconnected interaction handler module 150 includes a disconnected interaction tracker module 160, a priority queue handler module 170, and an agent assignment module 180. Within the disconnected interaction tracker module 160, a polling agent 162 polls disconnected interactions from the data store, and a prioritization module 164 receives the metadata 140 related to the disconnected interaction. Taking into consideration factors related to the disconnected interaction, past customer interaction history, etc., the prioritization module determines a disconnected customer priority index (DCPI) 166 for the disconnected customer, which can then serve as an input to a priority queue handler module 170.

The priority queue handler module 170 maintains its own separate priority queue to store metadata of disconnected interactions based on the DCPI 166 of the interaction. This module is also responsible for identifying the top two preferred digital channels 172 for the customer, if such a selection has been made or can be determined from historical data of the customer's past interactions. This information is then handed off to an agent assignment module 180, which identifies the best suited available agent based on the skill sets of the available agents' required skill sets on the preferred digital channel 184 or, if no one proficient on the preferred channel 184 is available, then on the #2 preferred channel. Agent information 182 may for example be fetched from the data store 130.

Outside of the disconnected interaction handler module, a digital channel redirection module 190 redirects the disconnected customer interaction to the selected digital channel with the selected agent. In an example, this module may send an SMS text message, Facebook Messenger message, WhatsApp message, etc. to the customer 110, notifying the customer 110 about the disconnection and suggesting connection over the selected digital channel 184. Details of the reconnected interaction may be relayed to other parts of the contact center, such as a supervisor dashboard 192 and/or a list of reporting inputs 194.

The disconnection queue management system 100 may thus increase the adoption of digital communication channels by call center customers, which can in turn reduce costs and increase customer throughput, while also driving increased customer satisfaction by reducing turnaround times for disconnected interactions.

It is noted that block diagrams are provided herein for exemplary purposes; a person of ordinary skill in the art will recognize myriad variations that nonetheless fall within the scope of the present disclosure. For example, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein.

Thus, the polling agent 162 may poll the disconnected interactions from the data store on a configurable periodic interval, after which the prioritization module 164 may calculate the disconnected customer priority index (DCPI) for each disconnected interaction fetched by polling agent. In an example, the DCPI may be calculated as:

$$\text{Disconnected Customer Priority Index} \propto [\text{Customer Request Tuple} * \text{Customer Tuple} * \text{Agent Tuple}] \quad (\text{EQN. 1})$$

Where the Customer Request Tuple is, for example, a function of the wait time in queue (INQUEUE_SECONDS), the request type (query, support, update), the issue urgency (ESCALATION_LEVEL), and the number of disconnects for customer in a day (ABANDONED_FLAG). Similarly, the Customer Tuple is, for example, a function of the customer segment (e.g., small-medium business (SMB), Premier, or Key), the customer abandonment rate (ABANDONED_FLAG), the customer sentiment, the customer ticket history, and the customer response for the callbacks on historical interactions (CUSTOMER_WAIT_FIRST_RESPONSE_SECONDS). The Agent Tuple is, for example, a function of the agent feedback against past Interactions with the customer (Rating), agent feedback for the disconnected interaction (connectivity).

Thus, the system can take live customer data, calculate a priority of disconnected customer interactions, store the disconnected interactions in a priority queue, and determine or estimate a preferred digital channel for that specific disconnected interaction, based on the current work shift. The digital channel redirection module 190 can then redirect the disconnected customer interactions to appropriate digital channels with an identified agent. The input to this module is disconnected customer information, identified preferred channel, and best suited agent information. The system will then try to connect the agent with the customer on one of the preferred channels.

Before continuing, it should be noted that the examples described above are provided for purposes of illustration, and are not intended to be limiting. Other devices and/or device configurations may be utilized to carry out the operations described herein.

Figure 2:
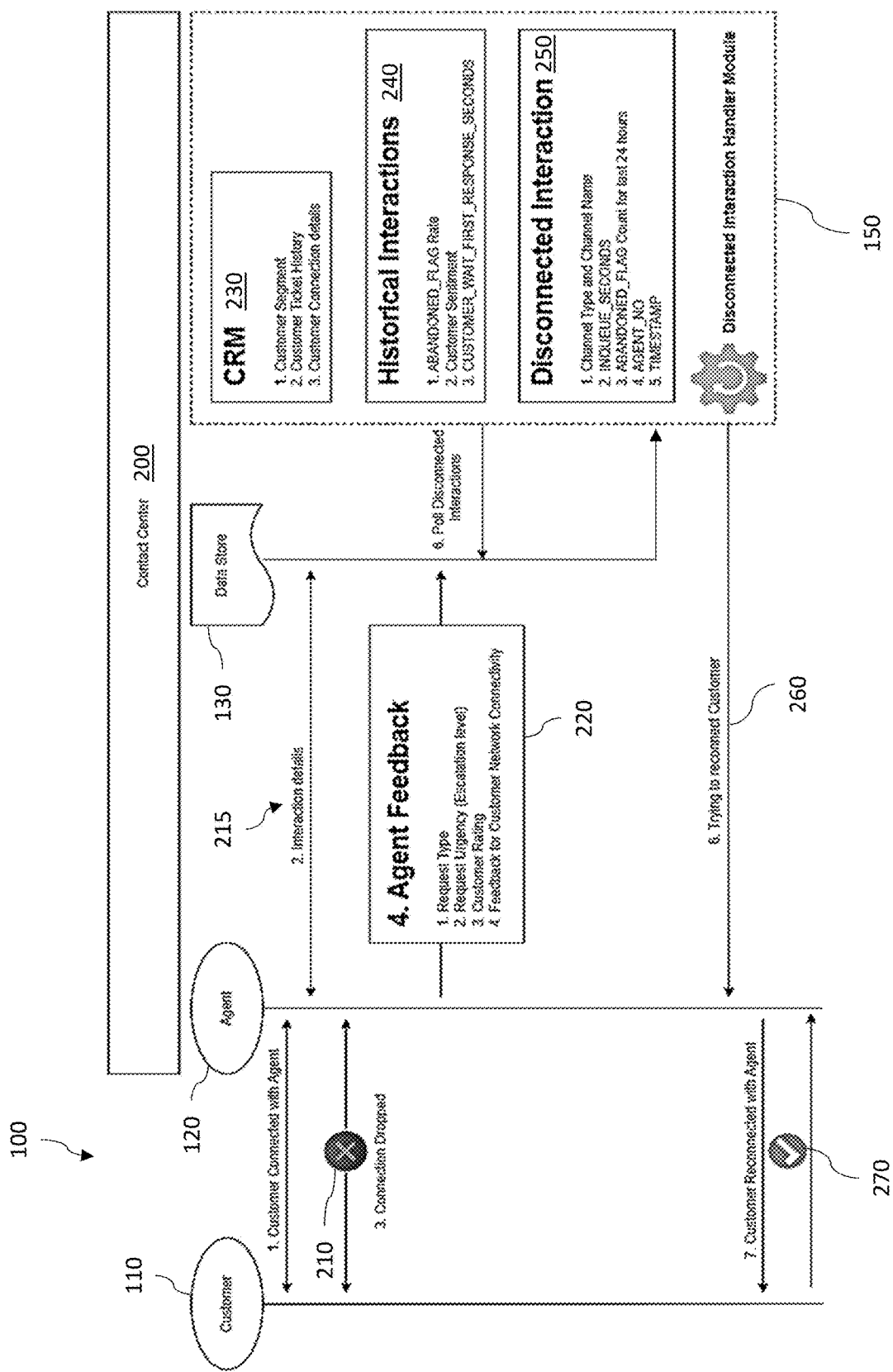
FIG. 2 is a schematic, diagrammatic representation, in block diagram form, of an example prioritized reconnection system, in accordance with at least one embodiment of the present disclosure.

FIG. 2 is a schematic, diagrammatic representation, in block diagram form, of an example prioritized reconnection system 100, in accordance with at least one embodiment of the present disclosure. In the example shown in FIG. 2, a customer 110 experiences a dropped connection 210 during a contact with an agent 120 at a call center 200. Automatically generated call details 215 and/or manually generated agent feedback 220 regarding the dropped connection 210 are then relayed to a disconnected interaction handler module 150. The details 215 or agent feedback 220 may for example include the request type or interaction type, the urgency of the call (e.g., escalation level), a rating for the customer, and feedback for customer network connectivity on the selected channel (e.g., sometimes a customer might have a bad network connection, and the agent can provide that as feedback. In an example, network connectivity may be good, bad or excellent). This may for example be stored in the data store 130 and queried or polled by the disconnected interaction handler module 150.

The disconnected interaction handler module 150 may receive customer relationship management (CRM) data 230, which may for example include the customer segment (e.g., whether the customer is a small or medium business, a premier customer, or a key customer), customer ticket history (e.g., details of past interactions with this customer), and customer connection details (e.g., details of a customer connection used for reconnection.) This information may be used for customer relationship management (CRM). For example, for a customer connected on Twitter the information may include a Twitter handle. The disconnected interaction handler module 150 may also receive historical interactions 240, which may for example include the number, rate, or percentage of calls that were abandoned by the customer, the customer sentiment (e.g., very satisfied, somewhat satisfied, not satisfied, dissatisfied, or very dissatisfied), and an average wait time for the customer to receive a first response—e.g., the time taken by the customer to respond to outbound interactions in past. For example, if an outbound call is initiated to the customer, and the customer took 10 seconds for first reply, then 10 seconds may be the value for this attribute. This attribute can then be used to know how fast the customer is likely to respond to future interactions initiated by the call center. The disconnected interaction handler module 150 may additionally receive disconnected interaction information 250, which may for example include the channel type and channel name of the interaction, the number of seconds the customer spent in a waiting queue, the number of times in the past 24 hours the customer has abandoned an interaction with the contact center, the agent(s) involved in the disconnected interaction, and the time(s) at which the interaction occurred.

The CRM information 230, historical interactions information 240, and disconnected interaction information 250 may for example be used to gauge the priority of reconnecting with this customer. This priority (e.g., the disconnected customer priority index or DCPI) may for example be a measure of how important this customer is to the business, and/or a measure of how dissatisfied the customer is, or how likely to become a dissatisfied customer who could potentially affect the reputation of the business. The CRM information 230, historical interactions information 240, and disconnected interaction information 250 may also be used to help determine which agent to assign to the reconnection, and on which channel(s) to re-connect.

A disconnected customer priority index (DCPI) for each disconnected interaction can be calculated based on Customer Request Tuple, Customer Tuple and Agent Tuple. In an example, there may be 5 disconnected interactions having customer names C1, C2, C3, C4 & C5. Customer Request Tuple score calculations may for example use Request Urgency and Request Type metadata tables associated with some integer values for each option and respective values to be used in the calculation (see Eqn. 2 and Tables 1-3, below). In an example, $$\text{Customer Request Tuple Score} = \quad \text{(EQN. 2)}$$
$$\text{(Wait Time + Request Type + Issue Urgency +}$$
$$\text{Abandonment events in a day)}$$

TABLE 3-continued

Customer Request Tuple

| Customer | Wait time in queue (seconds) | Request Type | Issue Urgency | Abandonment Events in a Day | Customer Request Tuple Score |
|---|---|---|---|---|---|
| C3 | 20 | Update | High | 2 | 28 |
| C4 | 13 | Query | Low | 3 | 18 |
| C5 | 16 | Query | Low | 2 | 20 |

Next a Customer Tuple Shiftwise Score can be calculated (see Eqn. 3 and Tables 4-7, below):

$$\text{Customer Tuple Shiftwise Score} = \quad \text{(EQN. 3)}$$
$$\text{(Customer Segment + Customer Abandonment Rate +}$$
$$\text{Customer Sentiment + Customer Ticket History +}$$
$$\text{Customer Response Index for shift)}$$

TABLE 1

Issue Urgency

| Low | 1 |
| Medium | 2 |
| High | 3 |

TABLE 2

Request Type

| Query | 1 |
| Support | 2 |
| Update | 3 |

TABLE 3

Customer Request Tuple

| Customer | Wait time in queue (seconds) | Request Type | Issue Urgency | Abandonment Events in a Day | Customer Request Tuple Score |
|---|---|---|---|---|---|
| C1 | 15 | Update | Medium | 1 | 21 |
| C2 | 12 | Support | High | 1 | 18 |

TABLE 4

Customer Segment and Associated Priority Score

| SMB | 1 |
| Premium | 2 |
| Key | 3 |

TABLE 5

Customer Sentiment

| Positive | 0 |
| Neutral | 1 |
| Negative | 2 |

TABLE 6

Customer Response Time Index

| Within 1 min | 4 |
| Within 5 min | 3 |
| Within 10 min | 2 |
| Within 15 min | 1 |
| Above 15 min | 0 |

TABLE 7

Customer Tuple Shiftwise

| Customer | Customer Segment | Customer Abandonment Rate | Customer Sentiment | Customer Ticket History | Customer response for the callbacks on historical interactions on any channel shiftwise | Customer Tuple Shiftwise Score |
|---|---|---|---|---|---|---|
| C1 | SMB | 6 | Positive | 3 | Within 1 min | 14 |
| C2 | Premium | 7 | Negative | 5 | Within 10 min | 18 |
| C3 | Key | 8 | Positive | 2 | Within 1 min | 17 |
| C4 | Key | 9 | Negative | 1 | Within 5 min | 17 |

TABLE 7-continued

Customer Tuple Shiftwise

| Customer | Customer Segment | Customer Abandonment Rate | Customer Sentiment | Customer Ticket History | Customer response for the callbacks on historical interactions on any channel shiftwise | Customer Tuple Shiftwise Score |
|---|---|---|---|---|---|---|
| C5 | SMB | 6 | Positive | 0 | Within 15 min | 8 |

Similarly, an Agent Tuple Score can be calculated as:

$$\text{Agent Tuple Score} = \text{(Agent feedback on past interations with customer} + \text{Agent Feedback on disconnected interaction)} \quad \text{(EQN. 4)}$$

The disconnected customer priority index (DCPI) can then be calculated as:

$$DCPI = \text{(Customer Request Tuple Score} * \text{Customer Tuple Shiftwise Score} * \text{Agent Tuple Score)}/100 \quad \text{(EQN. 5)}$$

As disconnected interactions are received in the order C1, C2, C3, C4 and C5 and based on DCPI, the order of processing these exemplary disconnected interactions will be calculated as C3, C1, C2, C4, C5, as follows, with higher value of DCPI representing higher priority (see Tables 8-11, below).

TABLE 8

Agent Feedback

| Bad | 0 |
|---|---|
| Good | 1 |
| Excellent | 2 |

TABLE 9

Agent Tuple

| Customer | Agent feedback against past interactions with the customer (rating) | Agent feedback for disconnected interaction (connectivity) | Agent Tuple Score |
|---|---|---|---|
| C1 | 5 | Good | 6 |
| C2 | 3 | Bad | 3 |
| C3 | 4 | Excellent | 6 |
| C4 | 2 | Good | 3 |
| C5 | 3 | Good | 4 |

TABLE 10

Disconnected Customer Priority Index

| Customer | DCPI |
|---|---|
| C1 | 17.64 |
| C2 | 9.72 |
| C3 | 28.56 |
| C4 | 9.18 |
| C5 | 6.4 |

TABLE 11

Priority Queue for Handling Disconnected Customers
(Sorted high-low by DCPI)

| Handling Order for Disconnected Customers |
|---|
| C3 |
| C1 |
| C2 |
| C4 |
| C5 |

A Customer Profile Tuple can then be calculated as:

$$\text{Customer Profile Tuple} = f(\text{age group, profession, location, last channel used}) \quad \text{(EQN. 6)}$$

This signifies the channel affinity based on customer parameters like age group, location, profession, and/or last channel used. For example—age group 18 to 30 is more active on digital channels like WhatsApp, Facebook, etc. than age group 60 to 75. As another example, customer location in China is more active on WhatsApp than other locations and customer location in Russia is more active on Telegram.

Digital channel recommendation for disconnected interaction will be calculated based on Customer Profile Tuple, Channel Positivity Score and Time Quotient for channel shift wise. In an example, the system has received the disconnected interaction for customer C1 and needs to select a digital channel, based on the Customer Profile Tuple containing information about the customer such as age group, profession, location and last channel used. A Channel Positivity Score will be calculated for each channel for this customer as follows:

$$\text{Channel Positivity Score} = \frac{\text{\# of times the contact attempt concludes successfully on a channel}}{\text{total number of contact attempts on the channel}} \quad \text{(EQN. 7)}$$

This score indicates how many times the contact attempted on a channel concluded positively vs. total contacts attempted. Higher score indicates the channel has more positivity as a best suited channel. This value is an indication for customer using a channel in particular shift based on historical data.

A Shiftwise Time Quotient for the channel can then be computed based on historical interaction completed successfully on specific channel on a given shift (see Eqn. 7 and Tables 12-17, below):

$$\text{Shiftwise Time Quotient} = \quad \text{(EQN. 7)}$$
$$\left(\sum (\text{customer responded on a channel in a shift}) > 0\right)$$

TABLE 12

Customer Profile Tuple

| Customer | Age group | Profession | Location | Last Channel used |
|---|---|---|---|---|
| C1 | 18-30 | Banking | Pune IN | Telegram |

TABLE 13

Channel Positivity Score

| Customer | Channel Name | Channel Positivity Score |
|---|---|---|
| C1 | Whatsapp | 1 |
| C1 | Facebook | 0.5 |
| C1 | Twitter | 1 |
| C1 | Telegram | 0.3 |

TABLE 14

Shift

| Shift | Time |
|---|---|
| Morning | 5 am-11 am |
| Afternoon | 11 am-5 pm |
| Evening | 5 pm to 11 pm |
| Night | 11 pm-5 am |

TABLE 16

Historical Interaction Metadata

| Customer | Time | Channel Name | Customer interaction concluded on same channel positively |
|---|---|---|---|
| C1 | 1 Jan 2 pm | Whatsapp | TRUE |
| C1 | 2 Jan 8 pm | Facebook | FALSE |
| C1 | 3 Jan 9 pm | Facebook | TRUE |
| C1 | 4 Jan 7 pm | Twitter | TRUE |
| C1 | 5 Jan 4 pm | Whatsapp | TRUE |

TABLE 16-continued

Historical Interaction Metadata

| Customer | Time | Channel Name | Customer interaction concluded on same channel positively |
|---|---|---|---|
| C1 | 6 Jan 7 am | Telegram | FALSE |
| C1 | 6 Jan 7 pm | Telegram | FALSE |
| C1 | 9 Jan 7 pm | Telegram | TRUE |

TABLE 17

Time Quotient for Channel Shiftwise

| Customer | Shift | Channel Name | Time Quotient |
|---|---|---|---|
| C1 | Morning | Whatsapp | 0 |
| C1 | Afternoon | Whatsapp | 1 |
| C1 | Evening | Whatsapp | 0 |
| C1 | Night | Whatsapp | 0 |
| C1 | Morning | Facebook | 0 |
| C1 | Afternoon | Facebook | 0 |
| C1 | Evening | Facebook | 1 |
| C1 | Night | Facebook | 0 |
| C1 | Morning | Twitter | 0 |
| C1 | Afternoon | Twitter | 0 |
| C1 | Evening | Twitter | 1 |
| C1 | Night | Twitter | 0 |
| C1 | Morning | Telegram | 0 |
| C1 | Afternoon | Telegram | 0 |
| C1 | Evening | Telegram | 1 |
| C1 | Night | Telegram | 0 |

In an example, take three scenarios of disconnected interaction of same customer (see Table 18, below):

Case 1: Customer disconnected in afternoon shift

Case 2: Customer disconnected in evening shift

Case 3: Customer disconnected in morning shift

Based on the time quotient, channel positivity score and Customer Profile Tuple, Top 2 preferred channels can be identified (see Table 19, below). Channels may for example be identified based on positive time quotient in a specific shift and then channel positivity score will be mapped to those selected channels. Preferred channels may then be the top two channels having highest channel positivity score. If no data is available for the time quotient and channel positivity score, then customer tuple will be used to recommend a channel. [

TABLE 18

Stage 1-Disconnected Customer Interaction

| Customer | Interaction Context | Interaction Disconnect Time |
|---|---|---|
| C1 | {CaseNumber, Channel etc.} | 10 Jan 3:15 pm |
| C1 | {CaseNumber, Channel etc.} | 29 Jan 6:27 pm |
| C1 | {CaseNumber, Channel etc.} | 31 Jan 7:24 am |

TABLE 19

Stage 2-Preferred Channel Identification

| Customer | Interaction Context | Shift | Channel Based on Positive Time Quotient | Channel positivity score | Preferred Channels |
|---|---|---|---|---|---|
| C1 | {CaseNumber Channel etc.} | Afternoon | [Whatsapp] | [Whatsapp: 1] | [WhatsApp] |
| C1 | {CaseNumber Channel etc.} | Evening | [Twitter, Facebook, Telegram] | [Twitter: 1, Facebook: 0.5, Telegram: 0.3] | [Twitter, Facebook] |
| C1 | {CaseNumber Channel etc.} | Morning | [ ] | [ ] | [Telegram] |

The disconnected interaction handler module 150 can then generate a reconnection attempt 260 to facilitate a reconnected interaction 270.

Figure 3:
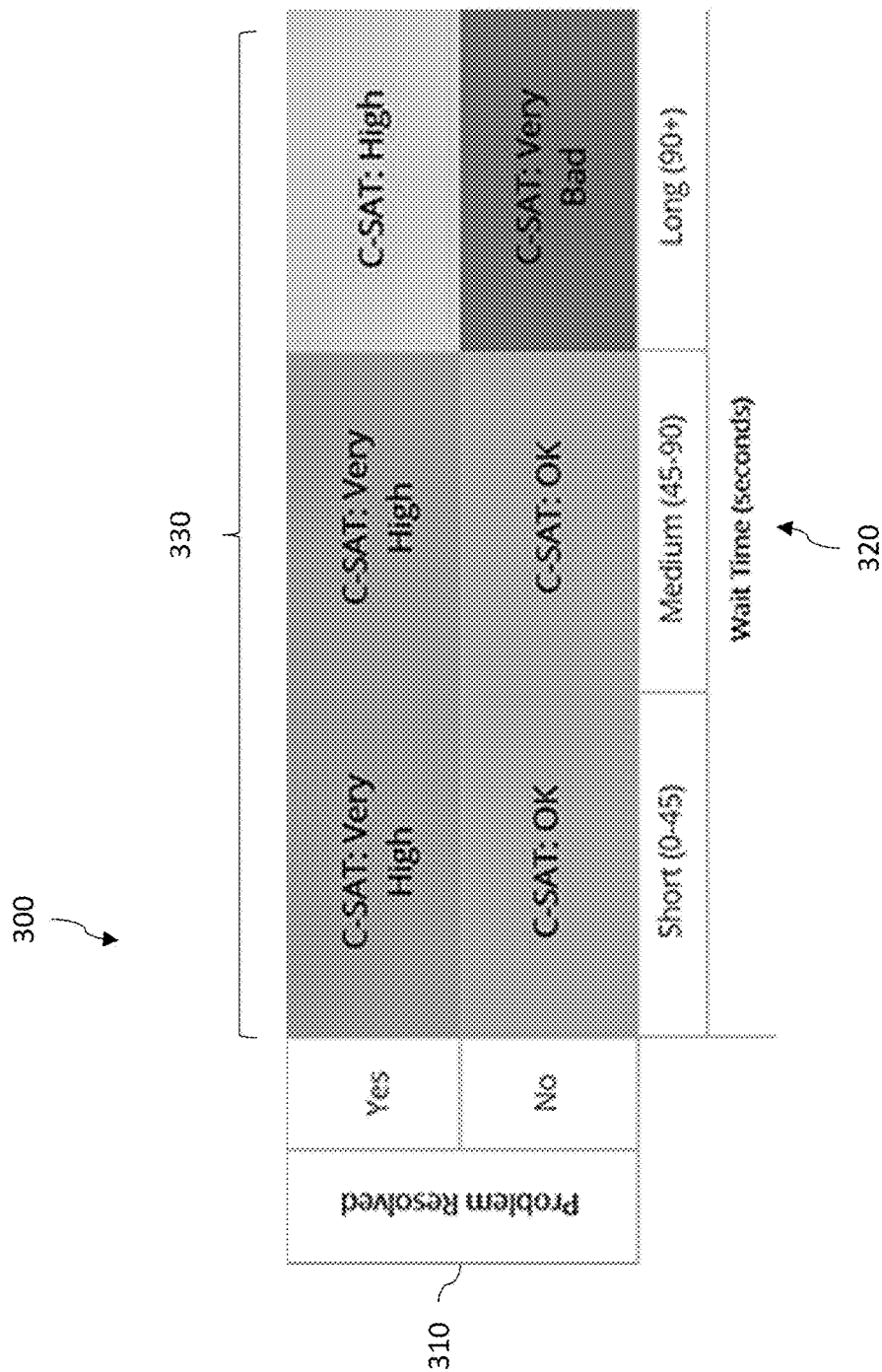
FIG. 3 is an example customer satisfaction chart, in accordance with at least one embodiment of the present disclosure.

FIG. 3 is an example customer satisfaction chart 300, in accordance with at least one embodiment of the present disclosure. The customer satisfaction chart 300 measures customer satisfaction 330 as a function of the customer's wait time 320 in seconds and whether or not the customer's problem was resolved. As can be seen, in cases where the customer's wait time is short and the problem is resolved, customer satisfaction may be very high. Conversely, if the customer's wait time is long and the problem is not resolved, customer satisfaction may be very poor. Interestingly, if the customer's problem is not solved, but their wait time is short, satisfaction may be merely "OK" rather than "bad", suggesting that wait times may actually be more important to the customer than problem resolution outcomes. Since customer satisfaction may be a major driver of business success, there may be a strong incentive for contact centers to keep wait times (especially for previously dropped calls) as short as possible.

Figure 4:
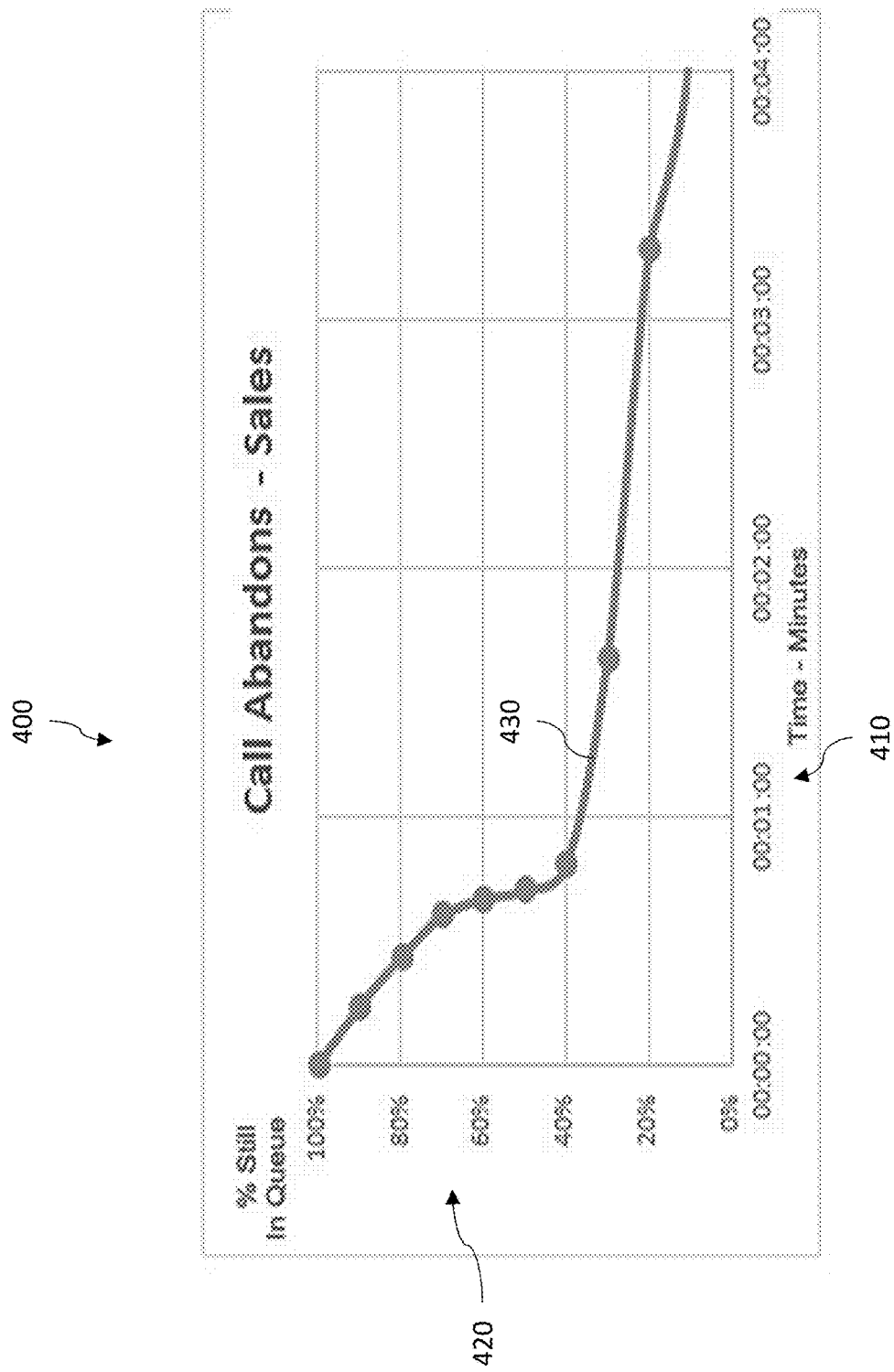
FIG. 4 is an example sales call abandonment chart, in accordance with at least one embodiment of the present disclosure.

FIG. 4 is an example sales call abandonment chart 400, in accordance with at least one embodiment of the present disclosure. The sales call abandonment chart 400 shows a curve 430 that plots the wait time 410 in minutes vs. the percentage 420 of callers who remain in the cue. As can be seen, approximately 10% of callers have already abandoned the interaction (e.g., hang up the phone) after a wait time 410 of only 15 seconds. After a wait time 410 one minute, more than 60% of callers have abandoned the call, and after a wait time of 4 minutes, approximately 90% of callers have abandoned the call. Since each abandoned call may represent a lost sale, there may be a strong incentive to keep customer wait times well under one minute, and preferably under 15 seconds.

Figure 5:
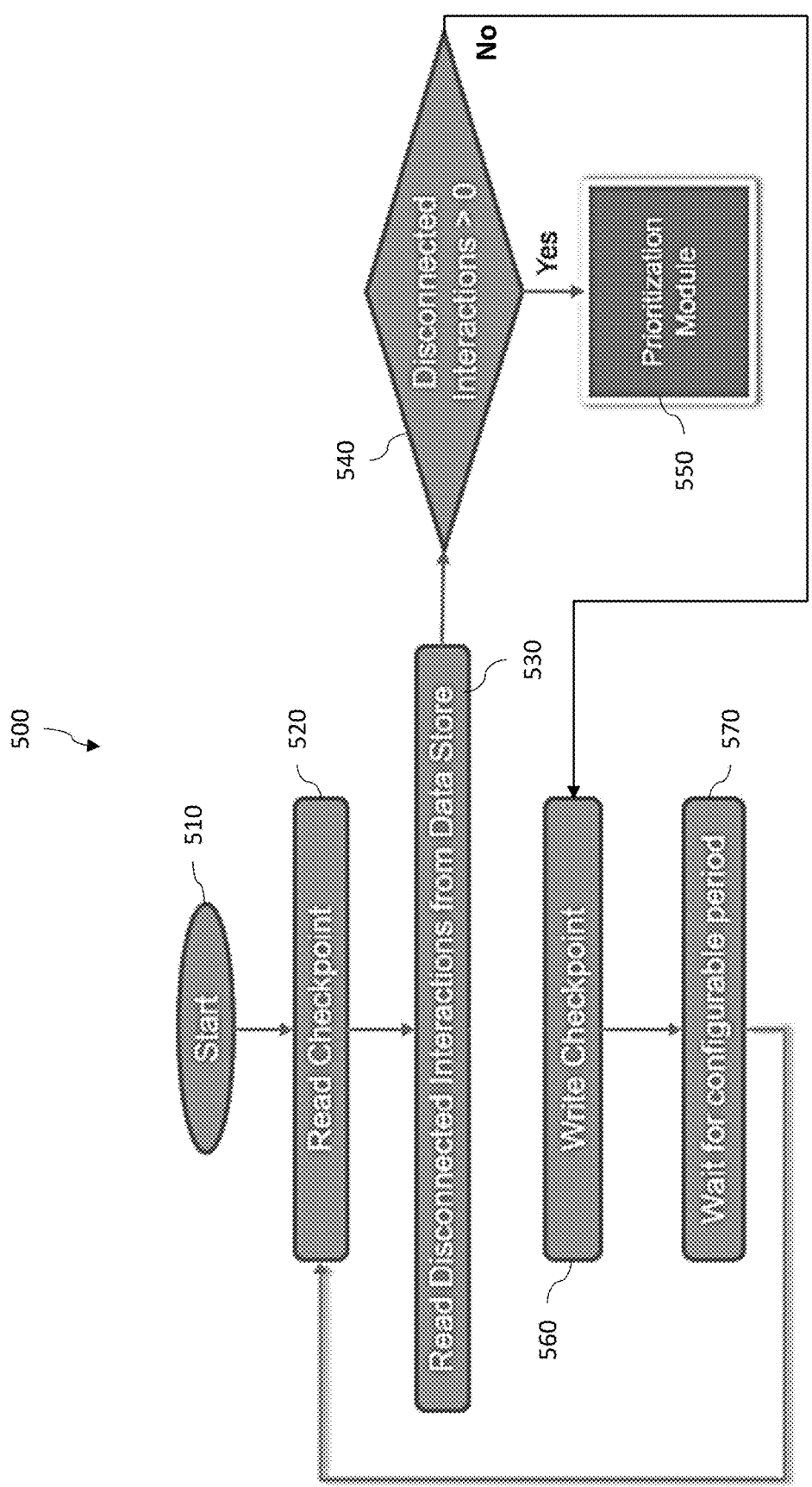
FIG. 5 is a schematic, diagrammatic representation, in flow diagram form, of an example disconnected interaction polling method, in accordance with at least one embodiment of the present disclosure.

FIG. 5 is a schematic, diagrammatic representation, in flow diagram form, of an example disconnected interaction polling method 500, in accordance with at least one embodiment of the present disclosure. It is understood that the steps of method 500 may be performed in a different order than shown in FIG. 5, additional steps can be provided before, during, and after the steps, and/or some of the steps described can be replaced or eliminated in other embodiments. One or more aspects of the method 500 can be carried by one or more devices and/or systems described herein, such as components of the prioritized reconnection system 100 and/or processor circuit 1950.

The disconnected interaction polling method 500 may for example poll the disconnected interactions from the data store on configurable periodic intervals, to read the checkpoint and then read the disconnected interactions from the data store from the previous checkpoint and, if the disconnected interactions count is greater than zero, then list of disconnected interactions may be provided to the prioritization module.

In step 510, the method 500 begins. Execution then proceeds to step 520.

In step 520, the method 500 includes reading a checkpoint. The checkpoint may for example be a timestamp indicating when the last data was processed, and may be stored in the data store. Execution then proceeds to step 530.

In step 530, the method 500 includes reading details (e.g., metadata) regarding one or more disconnected interactions that have occurred since the most recent checkpoint. Execution then proceeds to step 540.

In step 540, the method 500 includes determining whether any disconnected interactions have occurred since the most recent checkpoint. If yes, execution proceeds to step 550. If no, execution proceeds to step 560.

In step 550, the method 500 includes executing the prioritization module 550. The method is now complete.

In step 560, the method 500 includes writing a new checkpoint (e.g., timestamp) to the data store. Execution then proceeds to step 570.

In step 570, the method 500 includes waiting for the next configurable accumulation time period. (e.g., a fifteen minute time period). This can be any user-configurable amount of time for which system will read the disconnected interactions and add them to the queue. For example, after reading the disconnected interactions and adding these to queue, the method will then retry same operation after, e.g., 15 mins. Execution then returns to step 520.

It is noted that flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, since wait times of as little as 15 seconds have a measurable effect on call abandonment and customer satisfaction, it is desirable for the prioritized reconnection system to select an appropriate agent, select an appropriate contact channel, and re-connect the disconnected customer within about 0.5 to 10 seconds, preferably about 0.8 to 5 seconds, and in one more preferred embodiment within about 1-2 seconds of a confirmed disconnection, such that the prioritized reconnection system is not a significant contributor to customer wait times.

Figure 6:
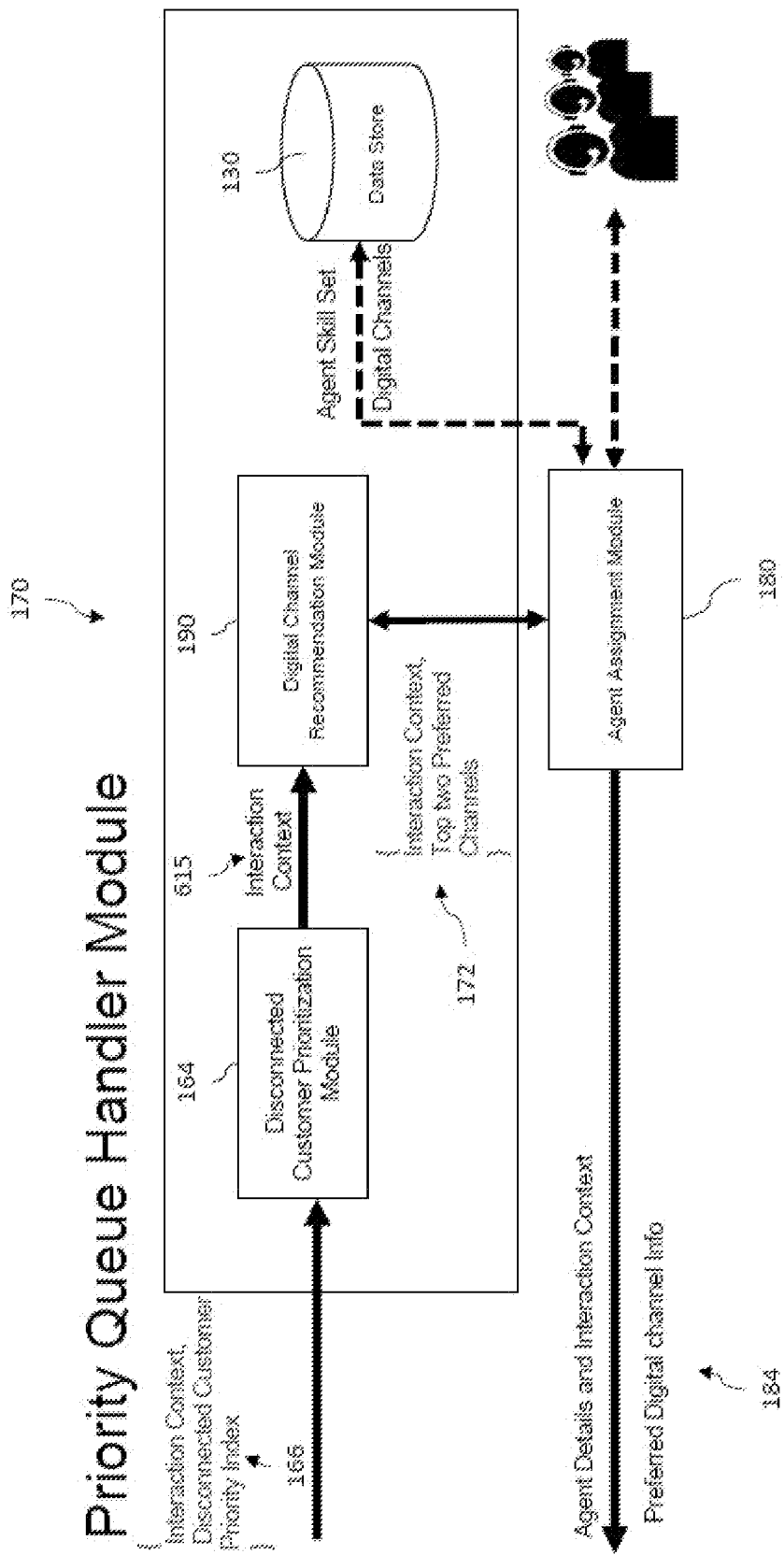
FIG. 6 is a schematic, diagrammatic representation, in block diagram form, of an example priority queue handler module, in accordance with at least one embodiment of the present disclosure.

FIG. 6 is a schematic, diagrammatic representation, in block diagram form, of an example priority queue handler module 170, in accordance with at least one embodiment of the present disclosure. In the example shown in FIG. 6, the priority queue handler module 170 receives a disconnected customer priority index 166 into the disconnected customer prioritization module 164, which determines the position the disconnected customer will take in the waiting queue. The disconnected customer prioritization module 164 then provides interaction context 615 to the digital channel recommendation module 190, which supplies the top two preferred channels 172 to the agent assignment module 180. The agent assignment module 180 exchanges information bidirectionally with the data store 130, regarding the skill set of particular agents with regard to particular digital channels. The agent assignment module 180 then uses this information to select the next available agent 120 who has proficiency in the preferred channel 184. Thus, the agent assignment module 180 redirects queries to specific agents based on required/matched skills and preferred channel(s). Agent information will be fetched from the data store, and the system will try to allocate the same agent from the previous disconnection, if free and available to work on any of customer preferred channels to continue same query. If the same agent is not available, then the agent assignment module will identify a most suited agent based on historical interactions sentiments and contact center key performance indicators (KPIs) on the selected digital channel(s).

Figure 7:
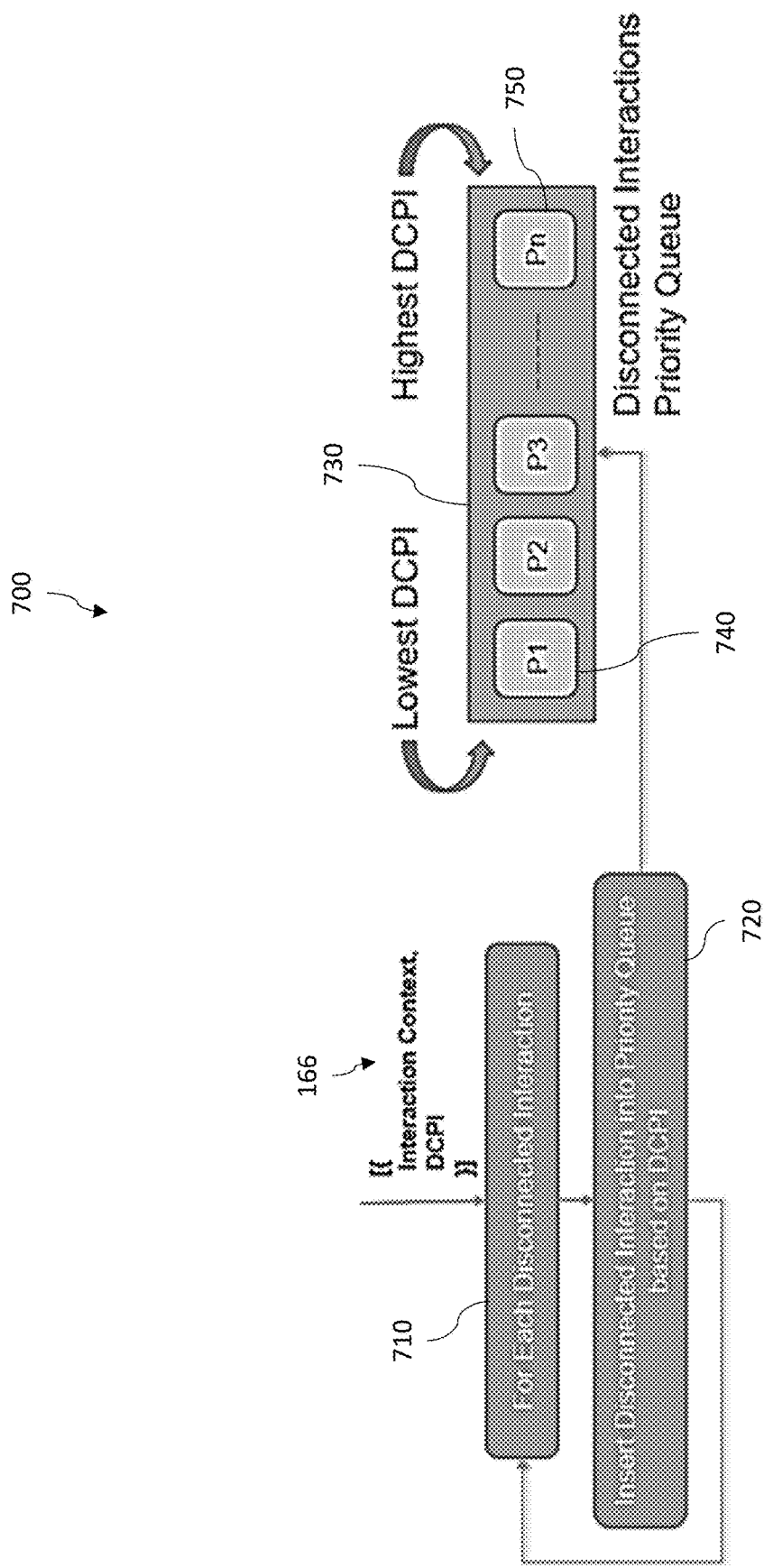
FIG. 7 is a schematic, diagrammatic representation, in flow diagram form, of an example disconnected customer prioritization method, in accordance with at least one embodiment of the present disclosure.

FIG. 7 is a schematic, diagrammatic representation, in flow diagram form, of an example disconnected customer prioritization method 700, in accordance with at least one embodiment of the present disclosure. Customer prioritization relies on two modules, to manage disconnected interactions in a priority queue ordered by DCPI, and to recommend the top two preferred digital channels based on historical data for highest priority disconnected interactions to be reconnected. Details about exemplary sub modules are set forth below.

The disconnected customer prioritization method 700 uses a priority queue to store disconnected interactions. A priority queue is a special type of queue in which each element (interaction) is associated with a priority value (in this case it will be DCPI value) and higher priority elements are served first. However, if elements with the same priority occur, they are served according to their order in the queue. Thus, the disconnected customer prioritization method 700 will have its own separate priority queue to store metadata of disconnected interactions based disconnected customer priority index. Based on this index, the sequence of queries will be managed and processed. The input to this module will be disconnected interaction context with disconnected customer priority index (DCPI) calculated from the prioritization module based on that priority disconnected interactions will be reconnected. In the example shown in FIG. 7, P1, P2, P3 and Pn are example values for DCPI, showing how disconnected interactions with respective priorities will be stored in priority queue assuming P1 is lesser and Pn is a higher DCPI value. Elements may be stored along with their associated disconnected interaction metadata as well.

In step 710, the method 700 includes receiving the DCPI 166 for at least one disconnected interaction, and then initiating a loop to be executed for each disconnected interaction that has not already been assigned to the waiting queue 730. Execution then proceeds to step 720.

In step 720, the method 700 includes inserting the disconnected interaction into the waiting queue 730 based on the interaction's DCPI 166. The queue is ordered such that interactions 740 with the lowest priority indices 166 are at the back of the queue 730, and will therefore wait the longest, whereas interactions 750 with the highest priority indices 166 are at the front of the queue 730, and will wait the shortest amount of time.

This exemplary method is now complete.

Figure 8:
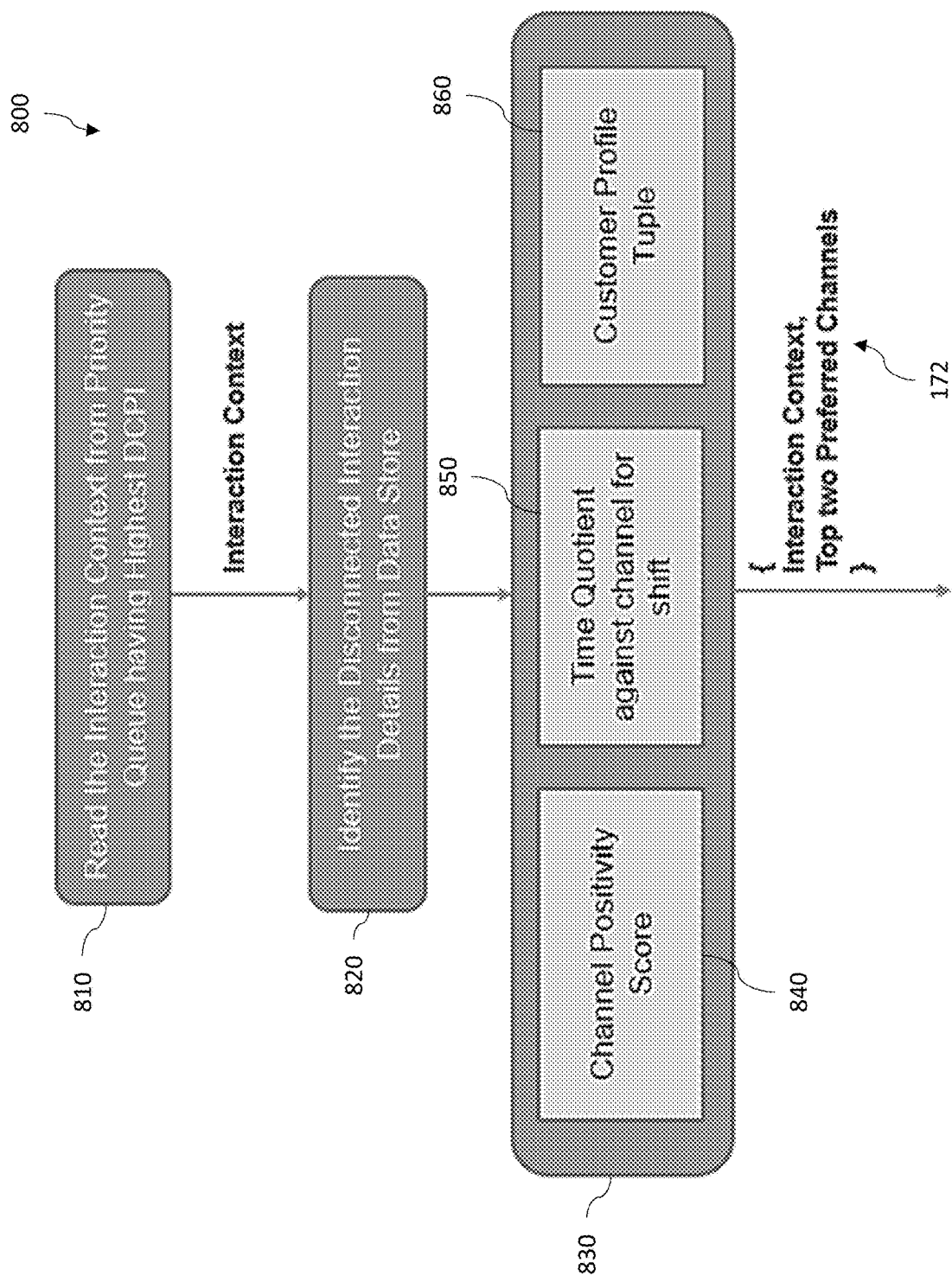
FIG. 8 is a schematic, diagrammatic representation, in flow diagram form, of an example digital channel recommendation method, in accordance with at least one embodiment of the present disclosure.

FIG. 8 is a schematic, diagrammatic representation, in flow diagram form, of an example digital channel recommendation method 800, in accordance with at least one embodiment of the present disclosure. This method identifies the top two preferred digital channels for the customer, by analyzing historical data for specific disconnected customers, as described above. The method also considers the time of the disconnection, such that the system will try to find recommendations for each shift (morning, afternoon, evening, and night), and then check the disconnection and reconnection times. In an example, if the system is trying reconnection during the morning shift, then the recommendation for the morning shift will be used. This logic will be executed for each disconnected interactions stored in priority queue in previous module:

In step 810, then method 800 includes reading the interaction context from the priority queue that has the highest associated DCPI. Execution then proceeds to step 820.

In step 820, the method 800 includes identifying the disconnected interaction details from the data store, as described above. Execution then proceeds to step 830.

In step 830, the method 800 includes computing a channel positivity score 840 for each of the available candidate channels, computing a time quotient 850 for each available channel vs. the current shift, and determining a customer profile tuple 860 for the selected disconnected interaction. This information is then used to select the top two preferred channels 172 for the customer.

This exemplary method is now complete.

Figure 9:
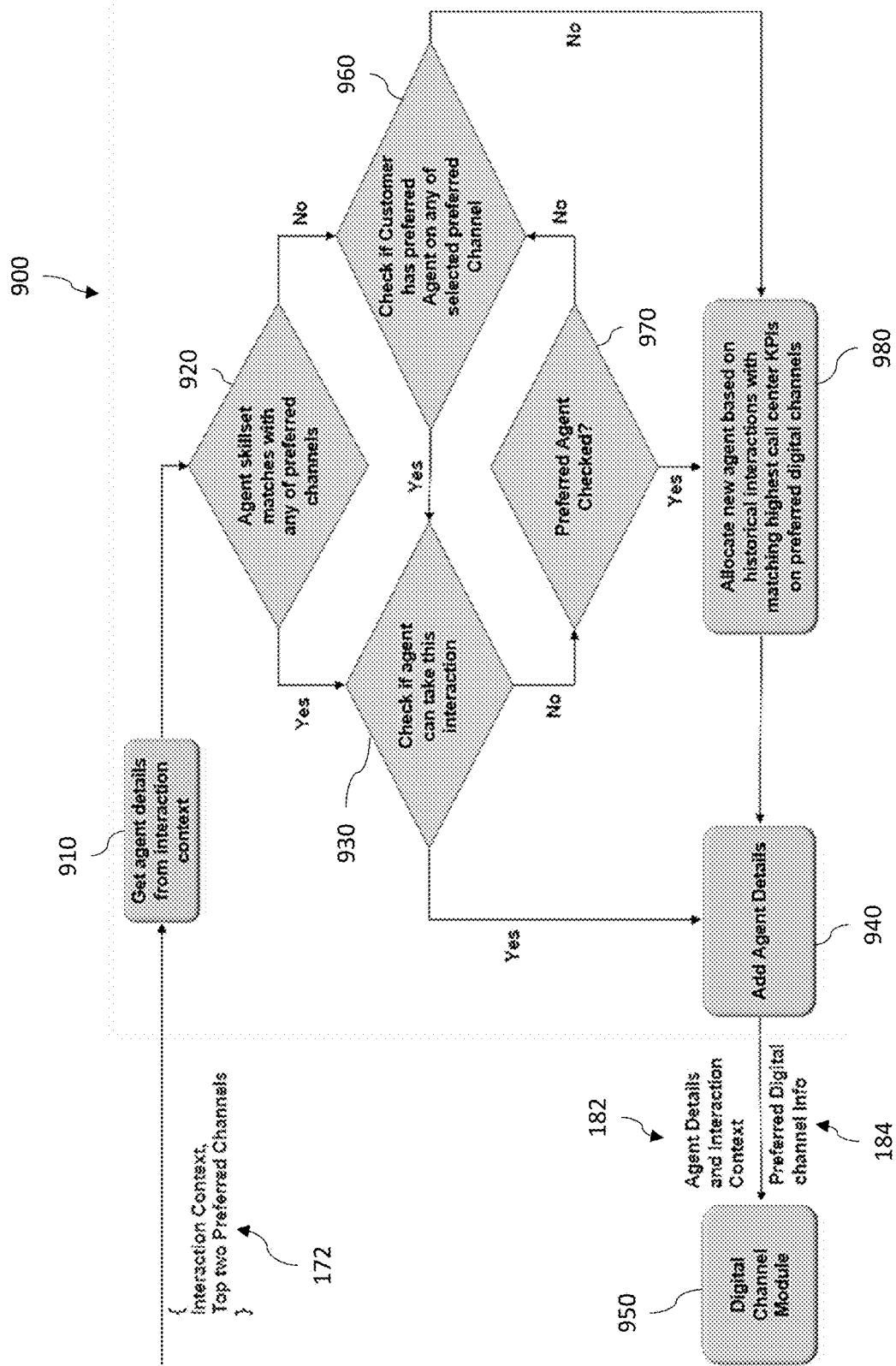
FIG. 9 is a schematic, diagrammatic representation, in flow diagram form, of an example agent assignment method, in accordance with at least one embodiment of the present disclosure.

FIG. 9 is a schematic, diagrammatic representation, in flow diagram form, of an example agent assignment method 900, in accordance with at least one embodiment of the present disclosure. This method redirects queries to specific agents based on required/matched skills and preferred channel. Agent information will be fetched from the data store. The system will try to allocate the same agent from the previous disconnection, if free and available to work on any of customer preferred channels to continue the same query, based on the interaction context received. If the same agent is not available, then the method will identify the most suited agent based on historical interactions sentiments and contact center KPIs on the selected digital channels.

In step 910, the method 900 includes receiving the two preferred channels 172 for the customer and fetching agent details for the disconnected interaction from the interaction context. Execution then proceeds to step 920.

In step 920, the method 900 includes determining whether the agent's skill set matches with either of the two preferred channels 172. If yes, execution proceeds to step 930. If no, execution proceeds to step 960.

In step 930, the method 900 includes determining whether the agent is available to take the re-connected interaction. If yes, execution proceeds to step 940. If no, execution proceeds to step 970.

In step 940, the method 900 includes selecting the preferred digital channel 184, and handing off the agent details 182 and the preferred channel 184 to the digital channel redirection module, as described above. This exemplary method is now complete.

In step 950, the method 900 includes reconnecting the disconnected interaction using the selected agent 182 and the selected (preferred) digital channel 184.

In step 960, the method 900 includes determining whether the customer has a preferred agent on any of the selected preferred channels 172. If yes, execution proceeds to step 930. If no, execution proceeds to step 980.

In step 970, the method 900 includes determining whether the preferred agent has been checked for availability. If yes, execution proceeds to step 980. If no, execution proceeds to step 960.

In step 980, the method 900 includes allocating a new agent. This allocation is based on historical interactions with a matching highest call center key performance index (KPI) on the two preferred digital channels 172. Execution then proceeds to step 940.

Figure 10:
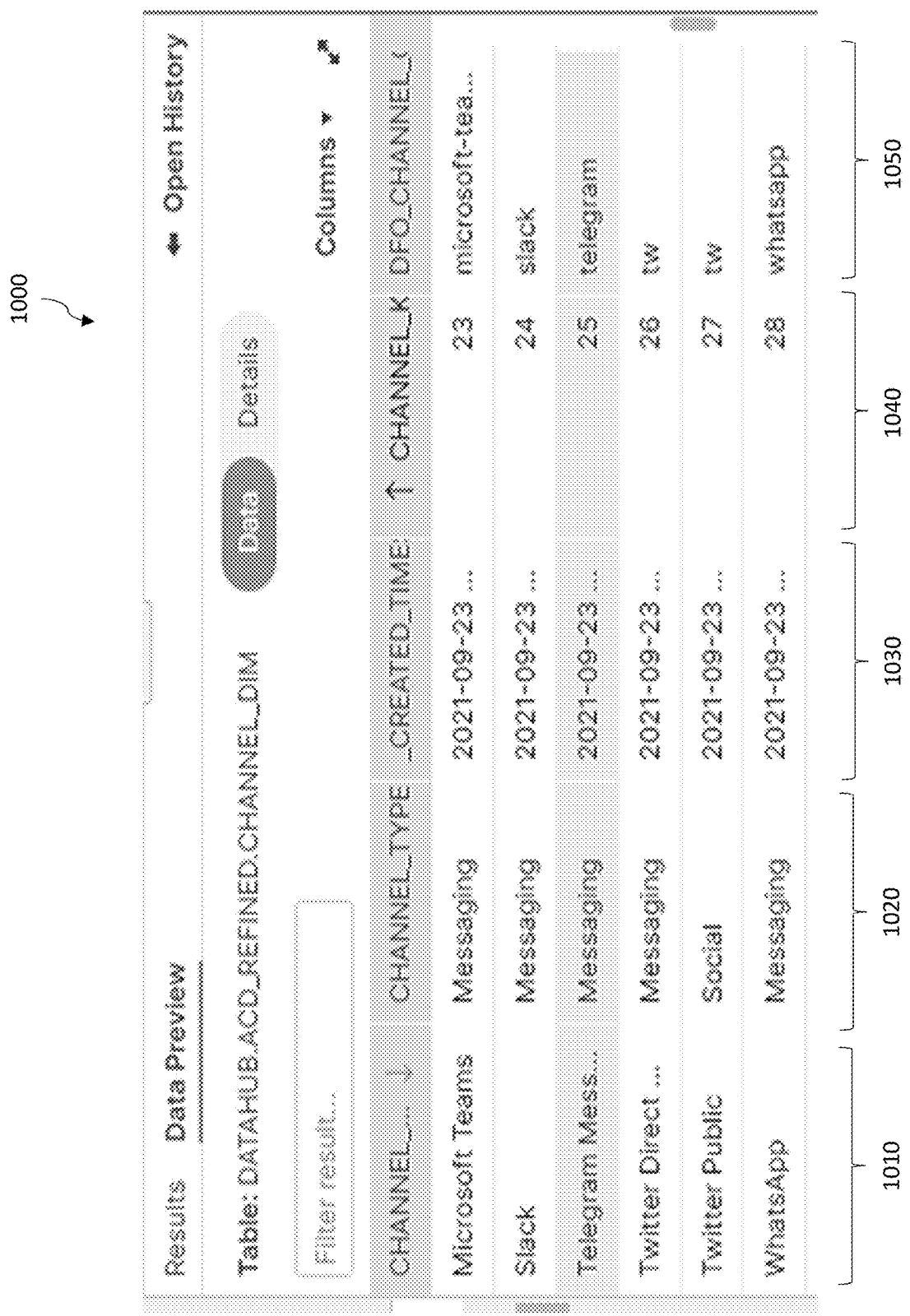
FIG. 10 is an example screen display of an available channels table or digital channel dimension table, in accordance with at least one embodiment of the present disclosure.

FIG. 10 is an example screen display of an available channels table or digital channel dimension table 1000, in accordance with at least one embodiment of the present disclosure. The available channels table 1000 includes a list of channel names 1010, along with corresponding channel types 1020, channel creation times 1030, channel numbers 1040, and channel notes 1050. This information is used by the digital channel recommendation module to check preferred channels used by customer from historical data.

FIG. 11 is an example screen display of a channel positivity table or sentiment dimension table 1100, in accordance with at least one embodiment of the present disclosure. The channel positivity table 1100 includes a list of sentiment ID numbers 1110, sentiment names 1120, and creation timestamps 1130. This information is used by the digital channel recommendation module to check the sentiment of customer and agent for disconnected interaction for historical data.

Figure 12:
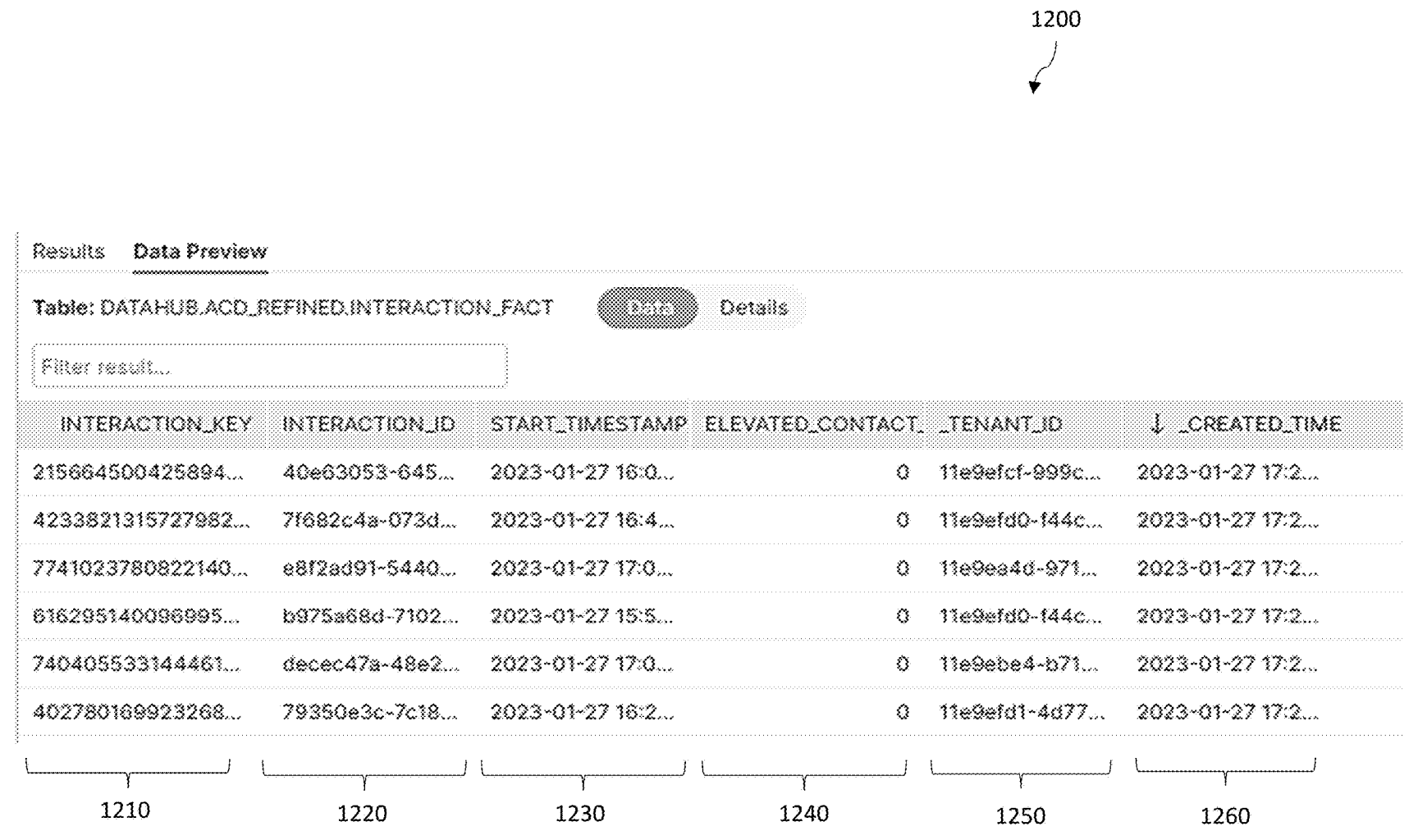

FIG. 12 is an example screen display of a disconnected interactions table 1200, in accordance with at least one embodiment of the present disclosure. The disconnected interactions table 1200 includes a list of interaction keys 1210, with corresponding interaction IDs such as start timestamps 1230, escalation counts 1240, tenant or customer IDs 1250, and creation timestamps 1260 (i.e., when data is stored in the data store).

This information is used by the DCPI module to help calculate the DCPI.

FIG. 13 is an example screen display of an agent contact table 1300, in accordance with at least one embodiment of the present disclosure. The agent contact table 1300 includes a list of agent keys 1310, along with corresponding interaction keys 1320, channel keys 1330, escalation counts 1340, disposition notes 1350, tenant or customer IDs 1360, and creation timestamps 1370. This table may for example be used to get the agent contact details for a specific interaction, where the agent may provide disposition notes including the following attributes: customer rating, issue urgency, network connectivity, and/or request type. These may be used in calculating the DCPI incase that specific interaction was disconnected.

Figure 14:
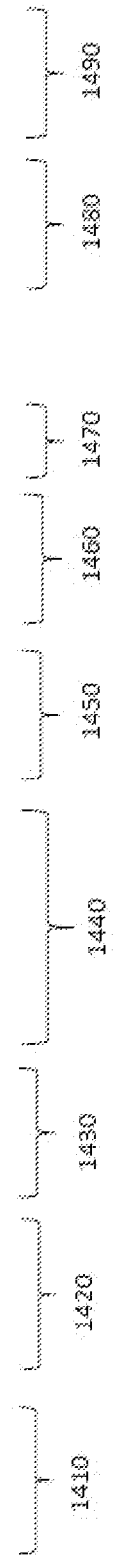
FIG. 14 is an example screen display of a prioritized abandoned interactions table, in accordance with at least one embodiment of the present disclosure.

FIG. 14 is an example screen display of a prioritized abandoned interactions table 1400, in accordance with at least one embodiment of the present disclosure. The prioritized abandoned interactions table 1400 includes a list of contact keys 1410, with corresponding interaction keys 1420, channel keys 1430, start timestamps 1440, number of seconds 1450 the interaction waited in a wait queue, contact durations 1460, true/false abandonment flags 1470, tenant or customer IDs 1480, and creation timestamps 1490. In an example, the start timestamp is the time when a specific interaction contact actually started, whereas the creation timestamp is the time when the interaction contact was stored in data store. This information is used by the DCPI module for interaction contact details such as queue time, contact duration and whether this interaction is abandoned or not. If the interaction is abandoned, then it will be prioritized for reconnection, and preferably re-connected.

Figure 15:
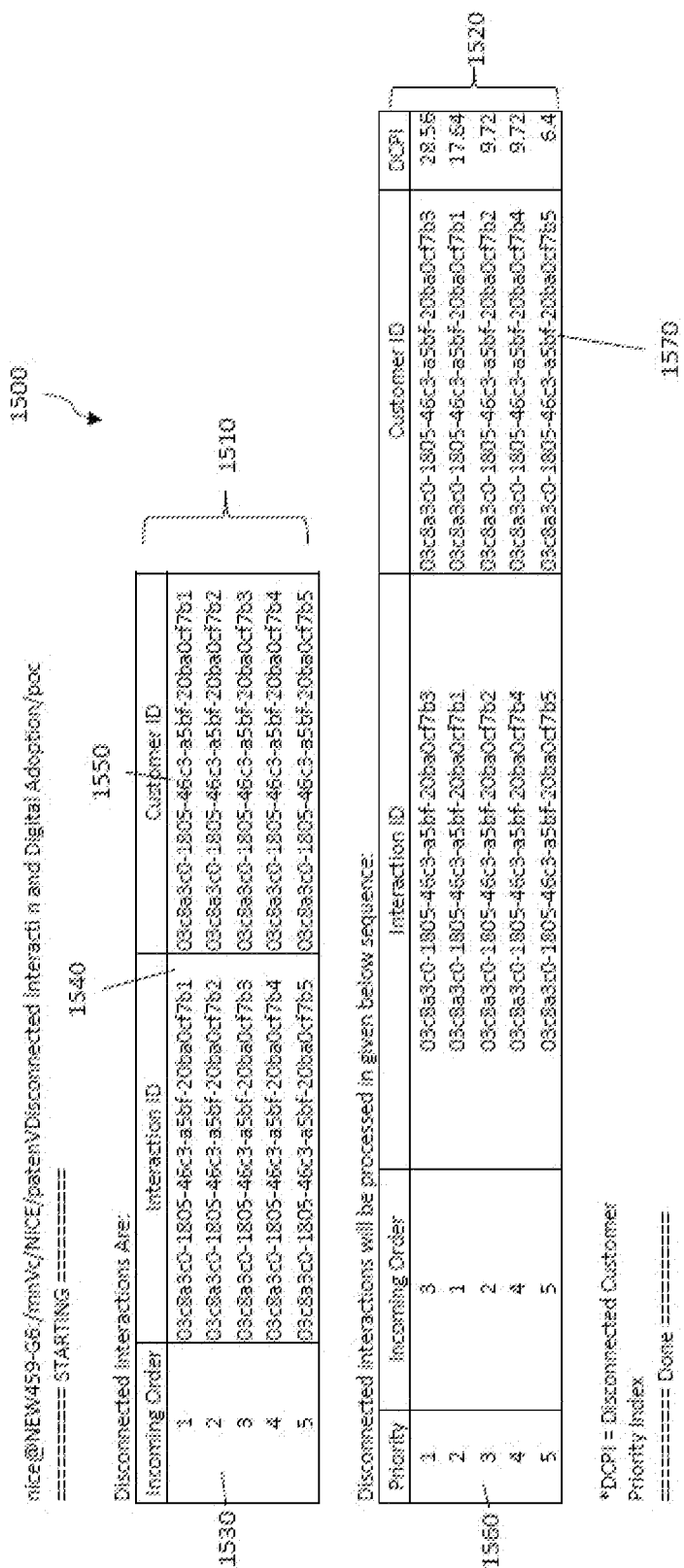
FIG. 15 is an example screen display of an abandoned interactions table arranged in incoming order, in accordance with at least one embodiment of the present disclosure.

FIG. 15 is an example screen display 1500 of an abandoned interactions table 1510 arranged in incoming order, and an abandoned interactions table 1520 arranged by priority, in accordance with at least one embodiment of the present disclosure. The abandoned interactions table 1510 includes a list of sequence numbers 1530, along with corresponding interaction IDs 1540 and customer IDs 1550. The abandoned interactions table 1560 includes the same information, but ordered according to a priority order 1560 based on a DCPI 1570. This information is used by the DCPI module to help prioritize the disconnected interactions.

Figure 16:
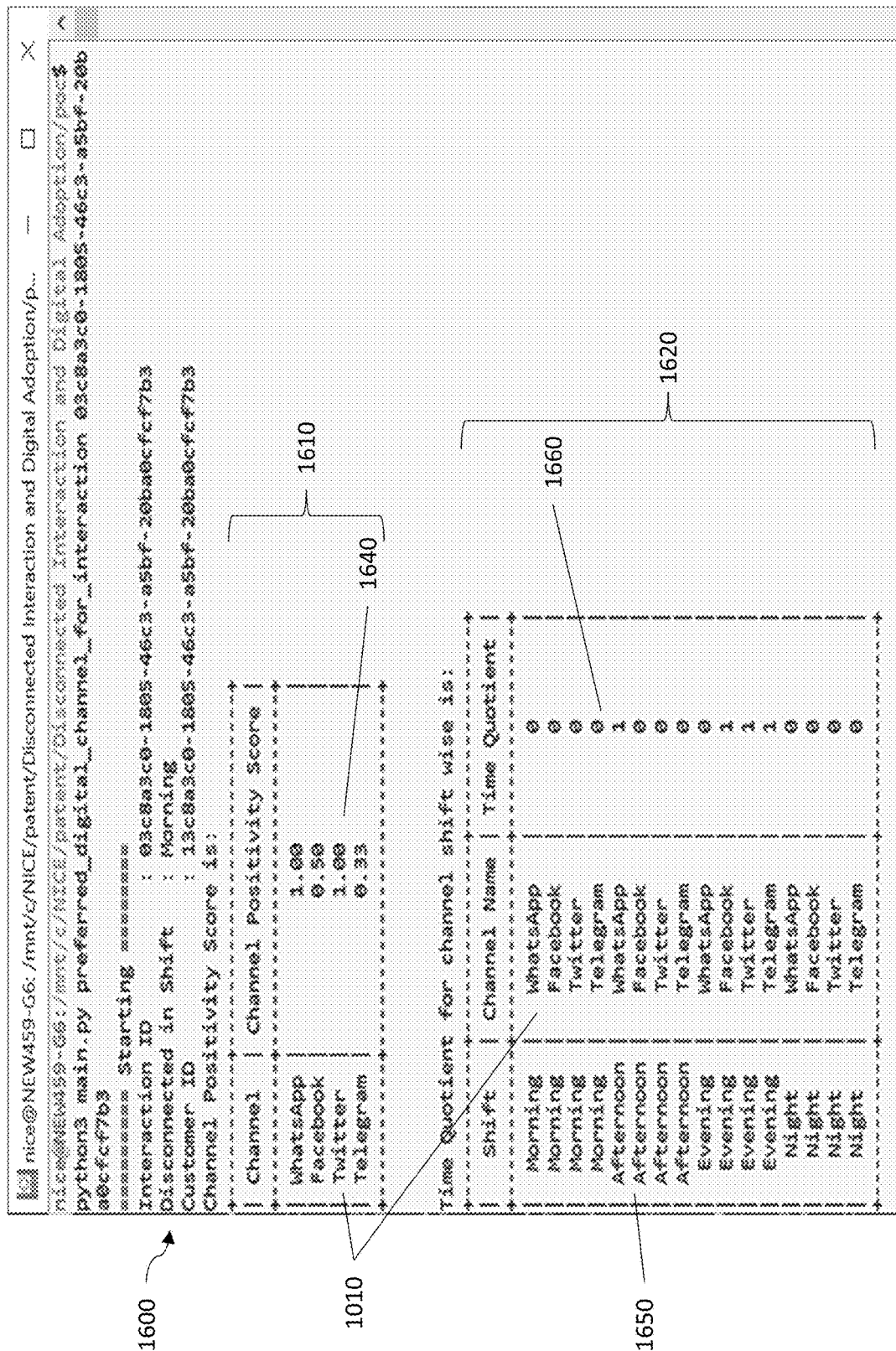
FIG. 16 is an example screen display of channel positivity table and a channel time quotient table, in accordance with at least one embodiment of the present disclosure.

FIG. 16 is an example screen display 1600 of channel positivity table 1610 and a channel time quotient table 1620, in accordance with at least one embodiment of the present disclosure. The channel positivity table 1610 includes a list of channels 1010 and corresponding channel positivity scores 1640. The channel time quotient table 1620 includes a list of shifts 1650 and corresponding channels 1010 with their computed time quotients 1660, indicating whether the disconnected customer uses a given channel during a given shift. This information is used by the channel recommendation module to help identify preferred digital channel(s) for a given shift.

Figure 17:
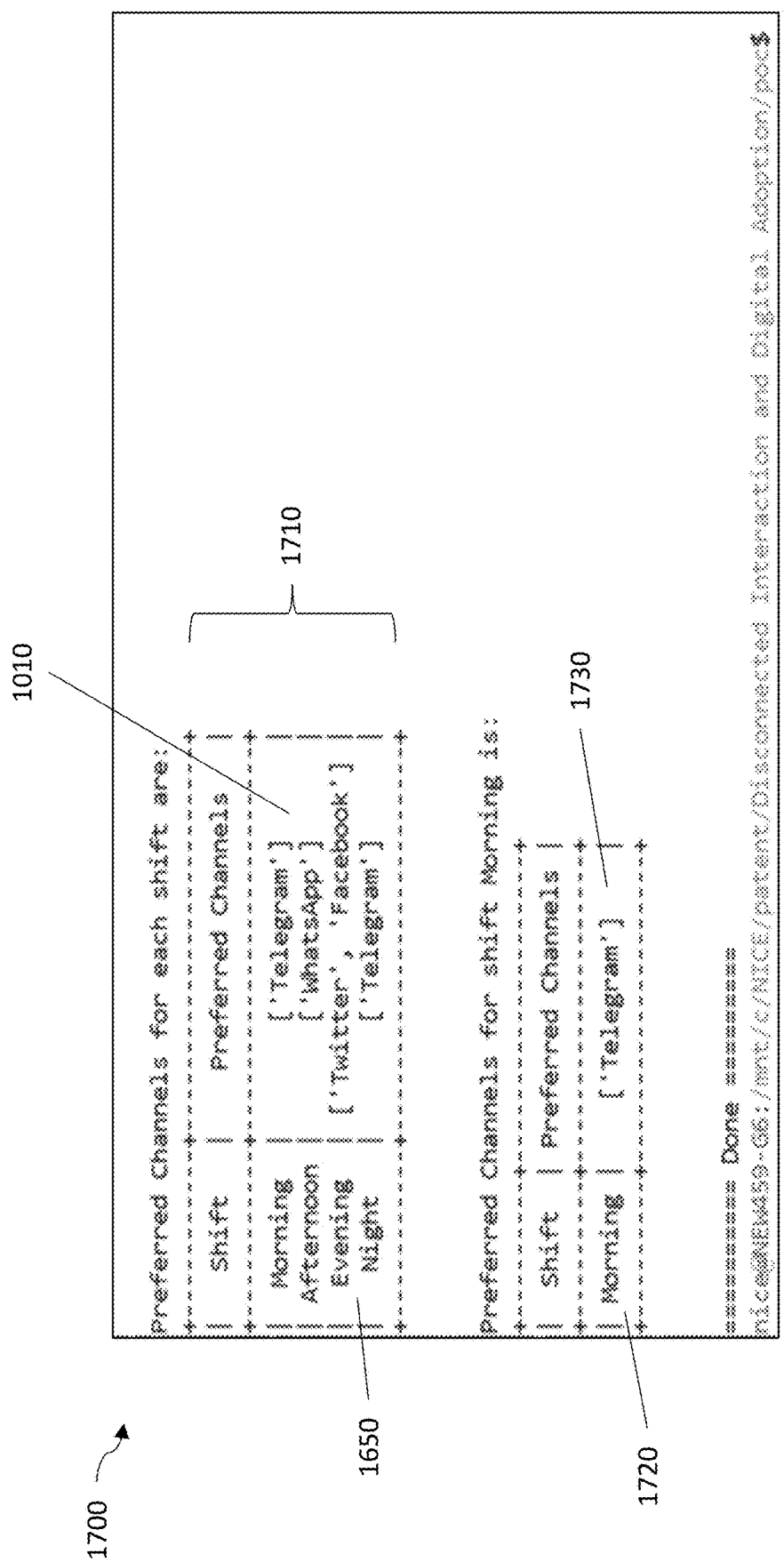
FIG. 17 is an example screen display of preferred channels per shift table and a preferred channel for the current shift, in accordance with at least one embodiment of the present disclosure.

FIG. 17 is an example screen display 1700 of preferred channels per shift table 1710 and a preferred channel 1730 for the current shift 1720, in accordance with at least one embodiment of the present disclosure. The preferred channels per shift table 1710 includes a list of shifts 1650 and corresponding preferred channels 1010. This information is used by the channel selection module to select preferred channel for the current time.

Figure 18:
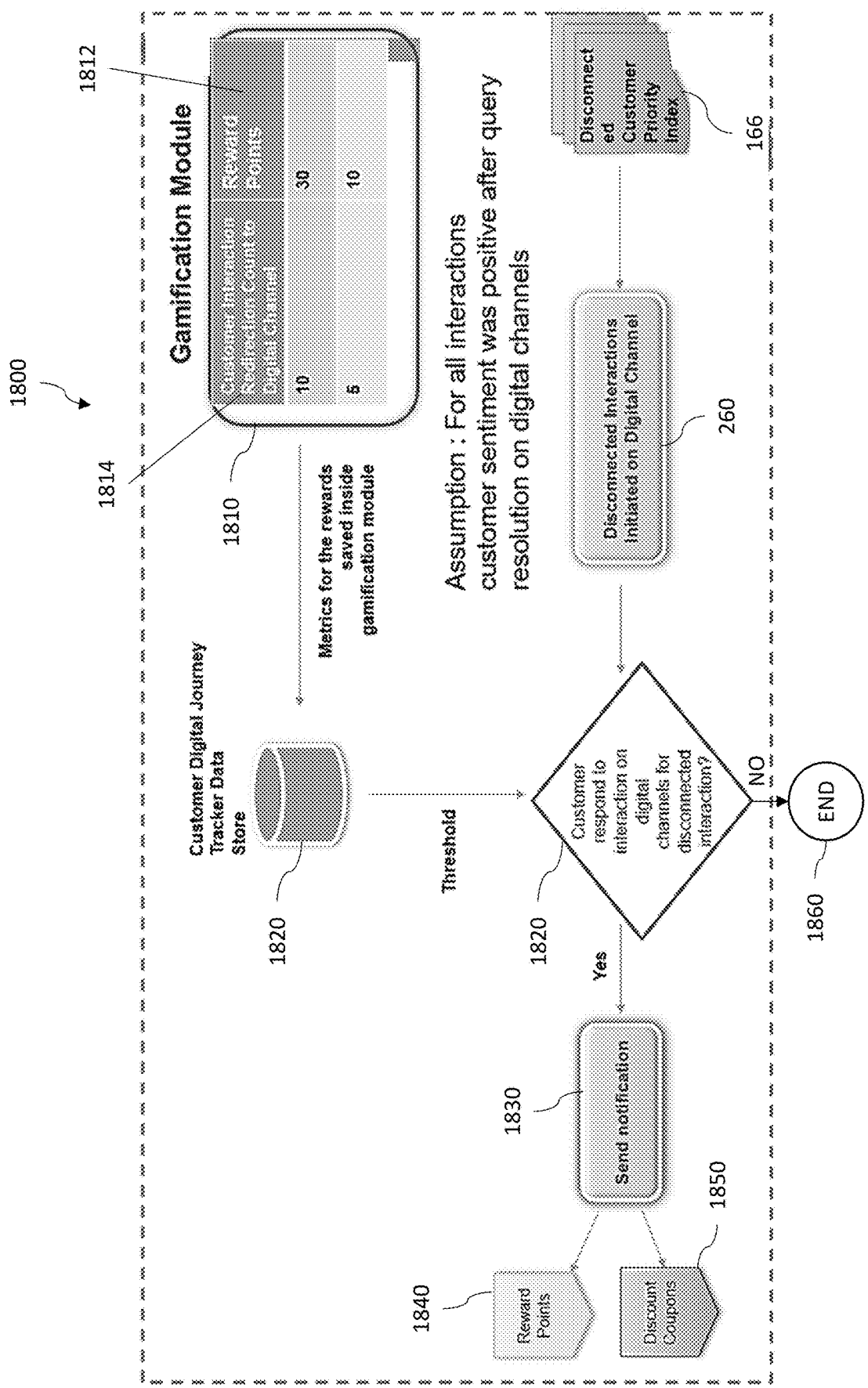
FIG. 18 is a schematic, diagrammatic representation, in flow diagram form, of an example gamification method, in accordance with at least one embodiment of the present disclosure.

FIG. 18 is a schematic, diagrammatic representation, in flow diagram form, of an example gamification method 1800, in accordance with at least one embodiment of the present disclosure. The gamification method provides rewards and recognition based on customer response to a reconnection attempt. In the example shown in FIG. 18, a gamification table 1810 assigns reward points 1812 based on a number 1814 of disconnected customer interactions that have been redirected to a digital channel. The gamification table 1810 may for example be stored in a customer digital journey tracker data store 1820, and in an example, a threshold is separately configurable for each contact center, and is stored in a Customer Digital Journey tracker module. Rewards may be provided when the number of reward points exceeds this threshold.

In step 1820, the method 1800 includes receiving an initiated customer reconnection 260 on a selected digital channel, according to the disconnected customer priority index 166. If the customer responds to the initiated customer reconnection 260, execution proceeds to step 1830. If the customer does not respond to the initiated customer reconnection 260, execution proceeds to step 1860.

In step 1830, the method includes sending a notification to the customer, indicating the issuance of reward points 1840 and/or discount coupons 1850. The method is now complete.

In step 1860, no notification is sent to the customer. The method is now complete.

In some implementations, it may be assumed that for all interactions, customer sentiment is positive after query resolution on digital channels.

Figure 19:
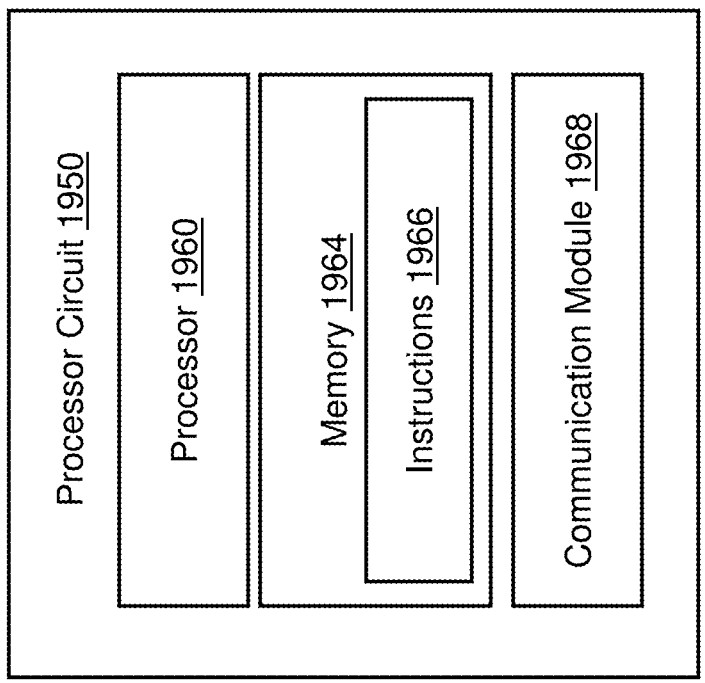
FIG. 19 is a schematic diagram of a processor circuit, according to embodiments of the present disclosure.

FIG. 19 is a schematic diagram of a processor circuit 1950, according to embodiments of the present disclosure. The processor circuit 1950 may be implemented in the prioritized reconnection system 100, or other devices or workstations (e.g., third-party workstations, network routers, etc.), or on a cloud processor or other remote processing unit, as necessary to implement the method. As shown, the processor circuit 1950 may include a processor 1960, a memory 1964, and a communication module 1968. These elements may be in direct or indirect communication with each other, for example via one or more buses.

The processor 1960 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1960 may also comprise another hardware device, a firmware device, or any combination thereof configured to perform the operations described herein. The processor 1960 may also be implemented as a combination of computing devices, e.g., a combination of a DSP and a microprocessor, a plurality of microprocessors, one or more microprocessors in conjunction with a DSP core, or any other such configuration.

The memory 1964 may include a cache memory (e.g., a cache memory of the processor 1960), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1964 includes a non-transitory computer-readable medium. The memory 1964 may store instructions 1966. The instructions 1966 may include instructions that, when executed by the processor 1960, cause the processor 1960 to perform the operations described herein. Instructions 1966 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1968 can include any electronic circuitry and/or logic circuitry to facilitate direct or indirect communication of data between the processor circuit 1950, and other processors or devices. In that regard, the communication module 1968 can be an input/output (I/O) device. In some instances, the communication module 1968 facilitates direct or indirect communication between various elements of the processor circuit 1950 and/or the prioritized reconnection system 100. The communication module 1968 may communicate within the processor circuit 1950 through numerous methods or protocols. Serial communication protocols may include but are not limited to United States Serial Protocol Interface (US SPI), Inter-Integrated Circuit (I²C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and a central server, or readings from a remote server or database) may be accomplished using any suitable wireless or wired communication technology, such as a cable interface such as a universal serial bus (USB), micro USB, Lightning, or Fire Wire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the prioritized reconnection system advantageously facilitates the rapid reconnection of disconnected customers, in order of priority, via low-coat, high-efficiency digital channels. A number of variations are possible on the examples and embodiments described above. For example, other channels (including digital, analog, or combinations thereof) may be used instead of or in addition to the specific examples disclosed herein. The technology described herein may be applied not only to contact centers, but to 911 switchboards, or any other system where users are in remote contact with agents.

Accordingly, the logical operations making up the embodiments of the technology described herein are referred to variously as operations, steps, objects, elements, components, or modules. Furthermore, it should be understood that these may occur or be performed or arranged in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the prioritized reconnection system. Connection references, e.g., attached, coupled, connected, joined, or "in communication with" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the prioritized reconnection system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system adapted to automatically prioritize and resume disconnected customer interactions, the system comprising:
    a processor and a non-transitory computer readable medium operably coupled thereto, the computer readable medium comprising a plurality of instructions stored in association therewith that are accessible to, and executable by, the processor, to perform operations which comprise:
        receiving a list of disconnected customer interactions, wherein the list includes metadata for each disconnected customer interaction;
        assigning a respective priority score to each respective disconnected customer interaction of the list of disconnected customer interactions with a prioritization module and the metadata;
        arranging the respective disconnected customer interactions in an order with a queuing module and the respective priority scores;
        assigning a respective available agent to each respective disconnected customer interaction in the order with an agent assignment module;
        selecting a respective channel for each respective disconnected customer interaction in the order based on a channel recommendation module and the metadata; and
        re-connecting a respective disconnected customer with the respective agent via the respective channel for each respective disconnected customer interaction in the order, wherein the metadata includes at least:
        a request type, a time of day, a duration, an agent, an escalation level, and a channel of each respective disconnected customer interaction;
        a request type, a time of day, a duration, a channel, an agent, a disconnection status, an escalation level; and
        a satisfaction level of at least two past interactions of the respective disconnected customer of the respective disconnected customer interaction; and
        for the respective disconnected customer of the respective disconnected customer interaction:
        a customer segment, a customer age group, or a customer location.

2. The system of claim 1, wherein the customer segment is selected from a list comprising "'small or medium business" (SMB), "Premier", and "Key'".

3. The system of claim 1, wherein assigning the respective priority score includes, with the metadata, calculating, for the respective disconnected customer:
    a customer abandonment rate;
    a customer sentiment;
    a customer ticket history; and
    a customer response for callbacks on historical interactions.

4. The system of claim 1, wherein assigning the respective available agent includes, for each available agent:
    determining an overall satisfaction level for the agent;
    determining a satisfaction level of the respective disconnected customer for the agent; and
    determining agent feedback of the respective disconnected customer.

5. The system of claim 1, wherein selecting the respective channel includes:
    determining two preferred channels for the respective disconnected customer;
    determining a time preference of the respected disconnected customer for each channel of the two preferred channels; and
    based on the time preference, selecting a channel of the two preferred channels.

6. The system of claim 1, wherein selecting the respective channel includes computing a channel positivity score for the channel.

7. The system of claim 1, wherein selecting the respective channel involves at least one of a customer age group, a customer profession, a customer location, or a last channel used.

8. The system of claim 1, wherein the selected channel is a voice channel or a video channel.

9. The system of claim 1, wherein the selected channel is a short message service (SMS) text channel, a real-time chat (RTC) channel, or a social media channel.

10. A computer-implemented method adapted to automatically prioritize and resume disconnected customer interactions, which method comprises:
    receiving a list of disconnected customer interactions, wherein the list includes metadata for each disconnected customer interaction;
    assigning a respective priority score to each respective disconnected customer interaction of the list of disconnected customer interactions with a prioritization module and the metadata;
    arranging the respective disconnected customer interactions in an order with a queuing module and the respective priority scores;
    assigning a respective available agent to each respective disconnected customer interaction in the order with an agent assignment module;
    selecting a respective channel for each respective disconnected customer interaction in the order based on a channel recommendation module and the metadata; and
    re-connecting a respective disconnected customer with the respective agent via the respective channel for each respective disconnected customer interaction in the order, wherein the metadata includes at least:
- a request type, a time of day, a duration, an agent, an escalation level, and a channel of each respective disconnected customer interaction;
- a request type, a time of day, a duration, a channel, an agent, a disconnection status, an escalation level; and a satisfaction level of at least two past interactions of the respective disconnected customer of the respective disconnected customer interaction; and
- for the respective disconnected customer of the respective disconnected customer interaction:
- a customer segment, a customer age group, or a customer location.

11. The computer-implemented method of claim 10, wherein the customer segment is selected from a list comprising "small or medium business" (SMB), "Premier", and "Key".

12. The computer-implemented method of claim 10, wherein assigning the respective priority score comprises, with the metadata, calculating, for the respective disconnected customer:
- a customer abandonment rate;
- a customer sentiment;
- a customer ticket history; and
- a customer response for callbacks on historical interactions.

13. The computer-implemented method of claim 10, wherein assigning the respective available agent comprises, for each available agent:
- determining an overall satisfaction level for the agent;
- determining a satisfaction level of the respective disconnected customer for the agent; and
- determining agent feedback of the respective disconnected customer.

14. The computer-implemented method of claim 10, wherein selecting the respective channel comprises:
- determining two preferred channels for the respective disconnected customer;
- determining a time preference of the respected disconnected customer for each channel of the two preferred channels; and
- based on the time preference, selecting a channel of the two preferred channels.

15. The computer-implemented method of claim 10, wherein selecting the respective channel comprises computing a channel positivity score for the channel.

16. The computer-implemented method of claim 10, wherein selecting the respective channel is based on at least one of a customer age group, a customer profession, a customer location, or a last channel used.

17. The computer-implemented method of claim 10, wherein the selected channel is a voice channel or a video channel.

18. The computer-implemented method of claim 10, wherein the selected channel comprises a short message service (SMS) text channel, a real-time chat (RTC) channel, or a social media channel.

* * * * *